United States Patent
Washisu et al.

[11] Patent Number: 6,035,132
[45] Date of Patent: *Mar. 7, 2000

[54] OPTICAL APPARATUS HAVING FLASH-ILLUMINATION-AREA CONTROLLING DEVICE USING IMAGE SHAKE CORRECTION DEVICE

[75] Inventors: Koichi Washisu; Masaru Yanagisawa, both of Tokyo, Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/823,877

[22] Filed: Mar. 17, 1997

Related U.S. Application Data

[63] Continuation of application No. 08/430,616, Apr. 28, 1995, abandoned, which is a continuation of application No. 08/083,249, Jun. 29, 1993, abandoned.

[30] Foreign Application Priority Data

Jun. 30, 1992 [JP] Japan .................................. 4-194533

[51] Int. Cl.[7] .................................................. G03B 17/00

[52] U.S. Cl. ............................................................ 396/55

[58] Field of Search .................................... 396/52, 53, 54, 396/55, 61; 358/208; 359/554, 555, 556, 557

[56] References Cited

U.S. PATENT DOCUMENTS

| | | | |
|---|---|---|---|
| 4,869,108 | 9/1989 | Washisu | 73/517 B |
| 4,965,619 | 10/1990 | Shikaumi et al. | 354/410 |
| 5,020,369 | 6/1991 | Washisu et al. | 73/517 A |
| 5,101,230 | 3/1992 | Shikaumi et al. | 354/430 |
| 5,150,148 | 9/1992 | Akami et al. | 354/430 X |
| 5,153,633 | 10/1992 | Otani | 354/430 |
| 5,170,255 | 12/1992 | Yamada et al. | 354/430 X |
| 5,175,580 | 12/1992 | Shiomi | 354/430 X |
| 5,194,888 | 3/1993 | Akashi et al. | 354/430 X |

*Primary Examiner*—Howard B. Blankenship
*Attorney, Agent, or Firm*—Fitzpatrick, Cella, Harper & Scinto

[57] ABSTRACT

The present invention relates to an optical apparatus such as an image-shake correcting device or a camera adapted to have a flash unit built therein or attachable thereto. The optical apparatus comprises an optical-axis deflecting assembly for varying a photographic area by deflecting the optical axis of a photographic optical system, and a control circuit for controlling the operation of the optical-axis deflecting assembly so that the photographic area of the photographic optical system is made to be substantially covered by an illumination area of the flash unit. According to the above-described arrangement, if a subject is located at, for example, a closest-distance position and is not completely positioned within the illumination area of the flash unit, the photographic optical axis is deflected so that the optical axis of the flash unit and the photographic optical axis intersect each other on a closest-distance side, whereby it is possible to position the subject within the illumination area of the flash unit at all times.

17 Claims, 16 Drawing Sheets

OPTICAL APPARATUS HAVING FLASH-ILLUMINATION-AREA CONTROLLING DEVICE USING IMAGE SHAKE CORRECTION DEVICE

This application is a continuation of application Ser. No. 08/430,616 filed Apr. 28, 1995, which is a continuation of Ser. No. 08/083,249 filed Jun. 29, 1993, both now abandoned.

BACKGROUND OF THE INVENTION

1. Field of the Invention

The present invention relates to an optical apparatus, such as a camera, having a flash-illumination-area controlling device for controlling the illumination area of flash light.

2. Description of the Related Art

A conventional type of camera has the disadvantage that during photography using a flash unit, if a subject is positioned close to the camera, the flash unit cannot illuminate the entire subject.

Such a disadvantage will be described below with reference to FIG. 20.

As shown in FIG. 20, a photographic area 34 of a camera 31 and an illumination area 33 of a flash unit 32 do not completely coincide with each other. If a subject is located at a position 35, the illumination area 33 can cover the entire photographic area 34, but if the subject is located at a position 36, the photographic area 34 will contain a portion which is not covered by the illumination area 33 (hereinafter referred to as "insufficiently illuminated portion" or similar). It is readily understood that the size of the insufficiently illuminated portion becomes larger as the focal length of a lens becomes shorter through zooming (for example, when the focal length is changed from 50 mm to 35 mm with a zoom lens set to its wide-angle side). of course, even if the subject is located at the closest-distance position, the problem of the insufficient illumination can be solved by enlarging an illumination angle so that the illumination area 33 can cover the entire photographic area 34 (as indicated by two-dot chain lines 30). However, if the illumination angle is enlarged in this manner, the illumination angle becomes excessively large with respect to the photographic area 34 and efficient illumination with flash light is not effected, that is to say, it is impossible to effectively utilize flash light.

SUMMARY OF THE INVENTION

A primary object of the present invention is, therefore, to provide an optical apparatus having a flash-illumination-area controlling device capable of solving the above-described problem involved in the related art.

To achieve the above-described object, according to one aspect of the present invention, there is provided an optical apparatus, such as an image-shake correcting device or a camera adapted to have a flash unit built therein or attachable thereto, which comprises optical-axis deflecting means for varying a photographic area by deflecting an optical axis of a photographic optical system, and control means for controlling an operation of the optical-axis deflecting means so that the photographic area of the photographic optical system is made to be substantially covered by an illumination area of the flash unit. According to the above-described arrangement, it is possible to position a subject within the illumination area of the flash unit at all times by deflecting the photographic optical axis to vary the inclination of the optical axis of the photographic optical axis with respect to the optical axis of the flash unit.

In accordance with another aspect of the present invention, there is provided an optical apparatus, such as an image-shake correcting device or a camera adapted to have a flash unit built therein or attachable thereto, which comprises photographic-optical-axis deflecting means for varying a photographic area by deflecting an optical axis of a photographic optical system, first control means for controlling an operation of the photographic-optical-axis deflecting means, the first control means controlling the photographic-optical-axis deflecting means so that the photographic area of the photographic optical system is made to be substantially covered by an illumination area of the flash unit, a viewfinder optical system, a viewfinder-optical-axis deflecting means for deflecting an optical axis of the viewfinder optical system, and second control means for controlling an operation of the viewfinder-optical-axis deflecting means, the second control means operating the viewfinder-optical-axis deflecting means in correspondence with the operation of the photographic-optical-axis deflecting means and varying an inclination of the optical axis of the viewfinder optical system.

According to the above-described arrangement, it is possible to inform a photographer that the optical axis of the photographic optical system is deflected. Accordingly, since the photographer inclines the apparatus itself according to the deflection of the optical axis, the illumination area of the flash unit is shifted so that the subject can be positioned within the illumination area.

In accordance with a further aspect of the present invention, there is provided an optical apparatus, such as an image-shake correcting device or a camera adapted to have a flash unit built therein or attachable thereto, which comprises optical-axis deflecting means for varying a photographic area by deflecting an optical axis of a photographic optical system, control means for controlling an operation of the optical-axis deflecting means, the control means controlling the optical-axis deflecting means so that the photographic area of the photographic optical system is made to be substantially covered by an illumination area of the flash unit, shake detecting means for detecting a shake applied to the optical apparatus, and shake-correcting-operation control means for operating the optical-axis deflecting means on the basis of an output of the shake detecting means. According to the above-described arrangement, not only is it possible to position a subject within the illumination area of the flash unit at all times, but it is also possible to obtain a shake-free image by executing image-shake correction.

The above and other objects, features and advantages of the present invention will become apparent from the following detailed description of preferred embodiments of the present invention, taken in conjunction with the accompanying drawings.

DETAILED DESCRIPTION OF THE PREFERRED EMBODIMENTS

Embodiments of the present invention will be described below with reference to the accompanying drawings.

(First Embodiment)

Figure 1:
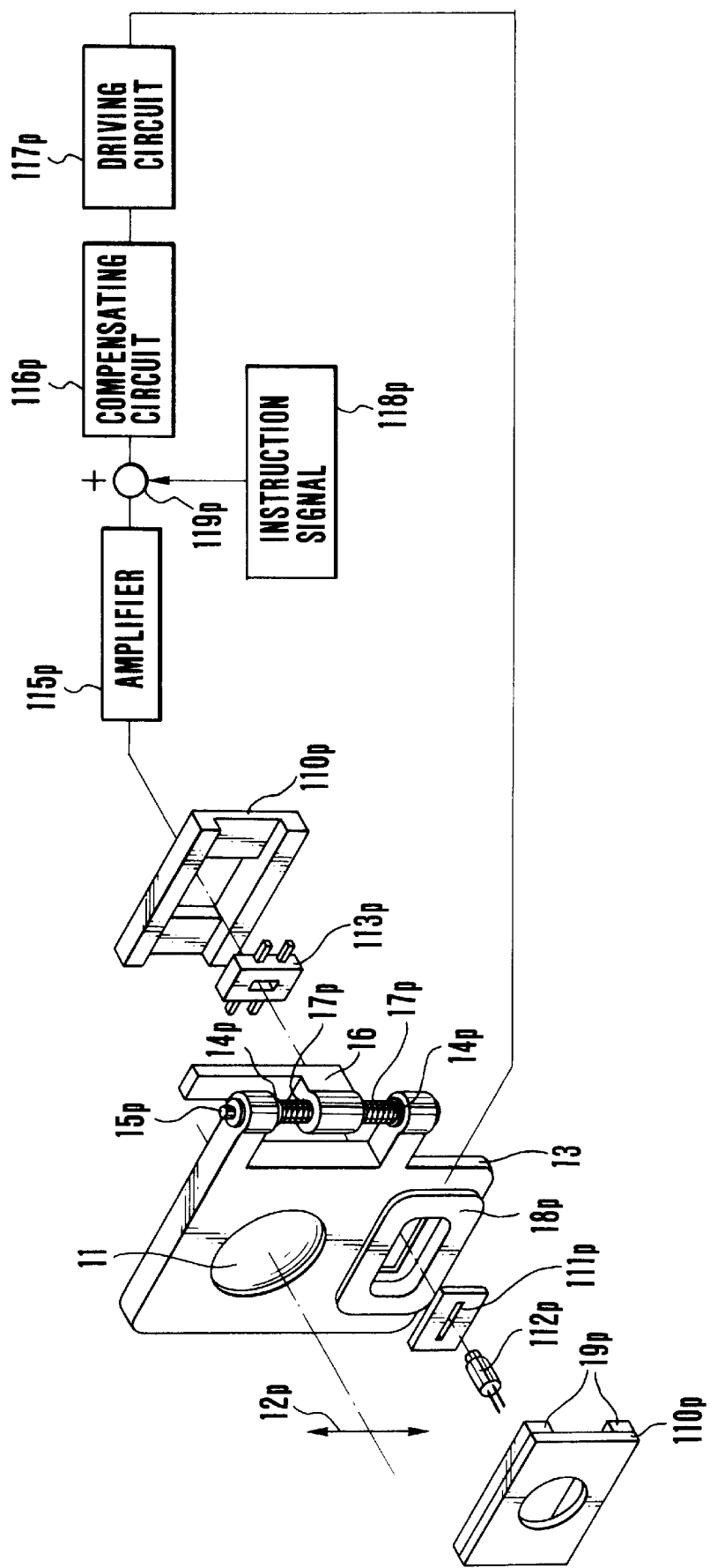
FIG. 1 is a schematic view of the arrangement of the essential portions of a flash-illumination-area controlling device, showing a first embodiment of the present invention.

FIG. 1 is a schematic view showing the arrangement of a flash-illumination-area controlling device suitable for use in a camera according to a first embodiment of the present invention. A correcting lens 11 is drivable in a direction (a pitch direction 12p) which intersects its optical axis at right angles. The arrangement of the flash-illumination-area controlling device will be described below.

In the arrangement shown in FIG. 1, a fixing frame 13 which holds the correcting lens 11 is slidable along a pitch slide shaft 15p by means of slide bearings 14p made of polyacetal resin (hereinafter referred to as "POM"). Pitch coil springs 17p coaxial to the pitch slide shaft 15p are held in compression between the slide bearings 14p of the fixing frame 13 in such a manner that the fixing frame 13 is held at or near its neutral position. The pitch slide shaft 15p is fitted through a first holding frame 16.

A pitch coil 18p is attached to the fixing frame 13. The pitch coil 18p is placed in a magnetic circuit formed by pitch magnets 19p and a pitch yoke 110p, and the fixing frame 13 is driven in the pitch direction 12p by causing an electric current to flow through the pitch coil 18p. The pitch coil 18p is provided with a pitch slit member 111p, and position detection of the fixing frame 13 with respect to the pitch direction 12p is performed in cooperation between a light emitter (infrared light emitting diode iRED) 112p and a light receiver (semiconductor position-sensitive detector PSD) 113p.

In the arrangement shown in FIG. 1, the output of the light receiver 113p is amplified by an amplifier 115p and inputted to the coil (pitch coil 18p) through the shown circuits (to be described later), the fixing frame 13 is driven and the output of the light receiver 113p varies. At this time, if the driving direction (polarity) of the pitch coil 18p is selected to make smaller the output of the light receiver 113p, a closed loop is formed and stabilizes at a point where the output of the light receiver 113p reaches approximately zero.

A compensating circuit 116p serves as a circuit for further stabilizing the loop of FIG. 1, an adding circuit 119p serves as a circuit for adding together the output signal of the amplifier 115 and an instruction signal 118p, and a driving circuit 117p serves as a circuit for supplying an electric current to be applied to the pitch coil 18p.

If the instruction signal 118p is supplied to the above-described loop from the outside, the correcting lens 11 is driven in the pitch direction 12p extremely faithfully in accordance with the instruction signal 118p.

Figure 2:
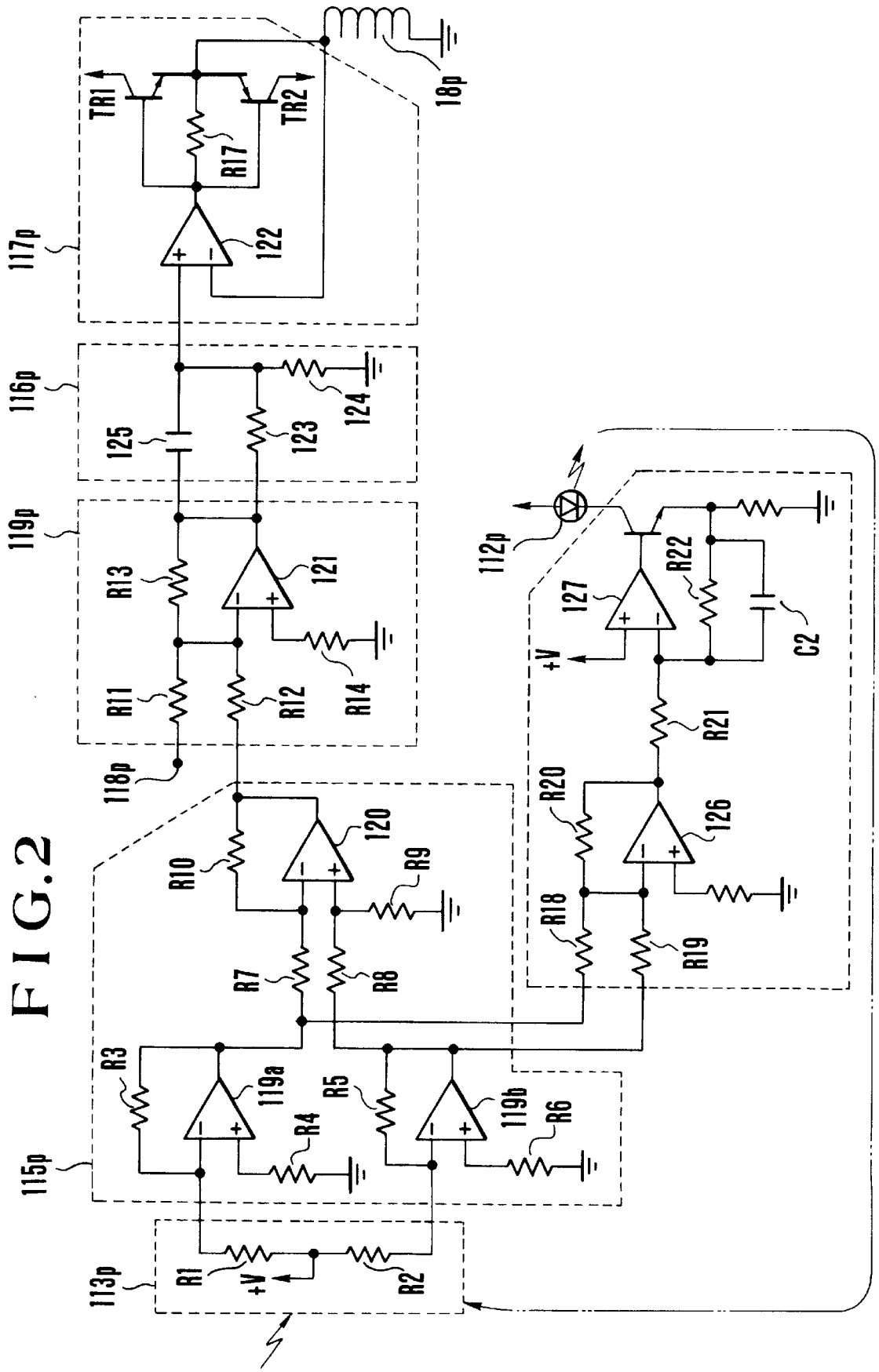
FIG. 2 is a circuit diagram showing a specific arrangement of driving means used in the arrangement shown in FIG. 1.

FIG. 2 is a circuit diagram showing in more detail driving means including the above-described circuits for driving the correcting lens 11, and the following description refers to driving in only the pitch direction 12p.

Current-voltage conversion amplifiers 119a and 119b convert a photoelectric current, which is produced in the light receiver 113p (including resistors R1 and R2) by light emitted from the light emitter 112p, into corresponding voltages, and a differential amplifier 120 finds the difference between the outputs of the current-voltage conversion amplifiers 119a and 119b. The difference signal indicates the position of the correcting lens 11 in the pitch direction 12p. The current-voltage conversion amplifiers 119a and 119b, the differential amplifier 120 and resistors R3 to R10 constitute the amplifier 115p shown in FIG. 1.

An amplifier 121 adds the instruction signal 118p to the difference signal from the differential amplifier 120. The amplifier 120 and resistors R11 to R14 constitute the adding circuit 119p shown in FIG. 1.

Resistors 123 and 124 and a capacitor 125 constitute a known phase advancing circuit which corresponds to the compensating circuit 116p shown in FIG. 1, and serve to stabilize the loop.

The output of the adding circuit 119p is inputted into a driving amplifier 122 through the compensating circuit 116p. In the driving amplifier 122, a driving signal for the pitch coil 18p is generated to displace the correcting lens 11. The driving amplifier 122, a resistor R17 and transistors TR1 and TR2 constitute the driving circuit 117p shown in FIG. 1.

An adding amplifier 126 finds the sum of the outputs of the current-voltage conversion amplifiers 119a and 119b (the total amount of the light received by the light receiver 113p), and a driving amplifier 127 receives the sum signal and drives the light emitter 112p in accordance with the sum signal. The adding amplifier 126, the driving amplifier 127, resistors R18 to R22 and a capacitor C2 constitute a driving circuit (not shown in FIG. 1) for the light emitter 112p.

The light emitter 112p tends to vary extremely unstably the amount of emission thereof with temperature or the like, and the position sensitivity of the differential amplifier 120 varies correspondingly. However, by controlling the light emitter 112p by means of the above-described driving circuit so that the total amount of the received light is kept constant in the above-described manner, it is possible to prevent the variation of the position sensitivity.

Figure 3:
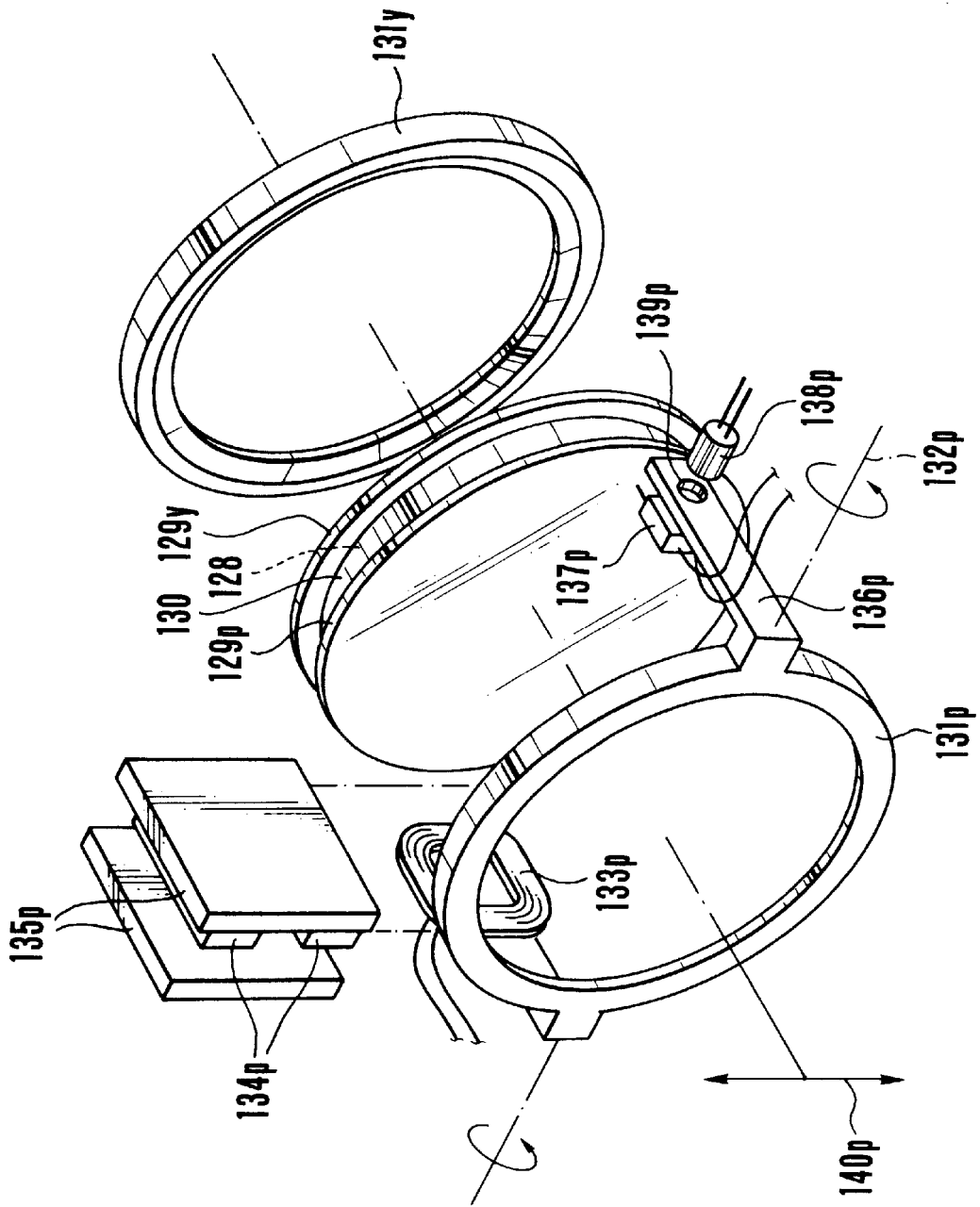
FIG. 3 is a schematic perspective view showing a variable angle prism which is another example of a correcting optical system according to the first embodiment of the present invention.

FIG. 3 is a schematic view showing the arrangement of the correcting optical mechanism using a variable angle prism.

In the arrangement shown in FIG. 3, a liquid 128 of high index of refraction, such as a silicone-based liquid, is enclosed without any bubbles by two flat glasses 129p and 129y and a polyethylene film 130. The flat glass 129p is held by a pitch holding frame 131p which is supported rotatably about a pitch axis 132p.

The pitch holding frame 131p is provided with a pitch coil 133p. Since the pitch coil 133p is placed in a closed magnetic path formed by pitch magnets 134p and pitch yokes 135p which are fixed in position, the pitch holding frame 131p is driven to rotate about the pitch axis 132p by causing an electric current to flow through the pitch coil 133p.

A displacement detecting light receiver 137p is secured to an arm 136p of the pitch holding frame 131p. The displacement detecting light receiver 137p performs detection of the rotation of the pitch holding frame 131p about the pitch axis 132p by receiving a reduced infrared light ray projected through a hole 139p from an infrared light emitter 138p, which is fixed in position. Although the displacement detecting light receiver 137p and the pitch coil 133p are placed under known position control, since the known position control has been described previously in connection with the slide type of correcting optical mechanism, description thereof is omitted.

In the above-described arrangement, when the pitch holding frame 131p rotates about the pitch axis 132p and the flat glass 129p inclines about the pitch axis 132p, light rays passing through the liquid 128 of high index of refraction are deflected in the direction of an arrow 140p.

The maximum feature of the above-described variable angle prism is that it is possible to deflect the optical axis whatever type of optical system is disposed before and/or after the variable angle prism along the optical axis. For example, if the variable angle prism is mounted in front of any type of lens, it is possible to correct the optical axis.

Figure 4:
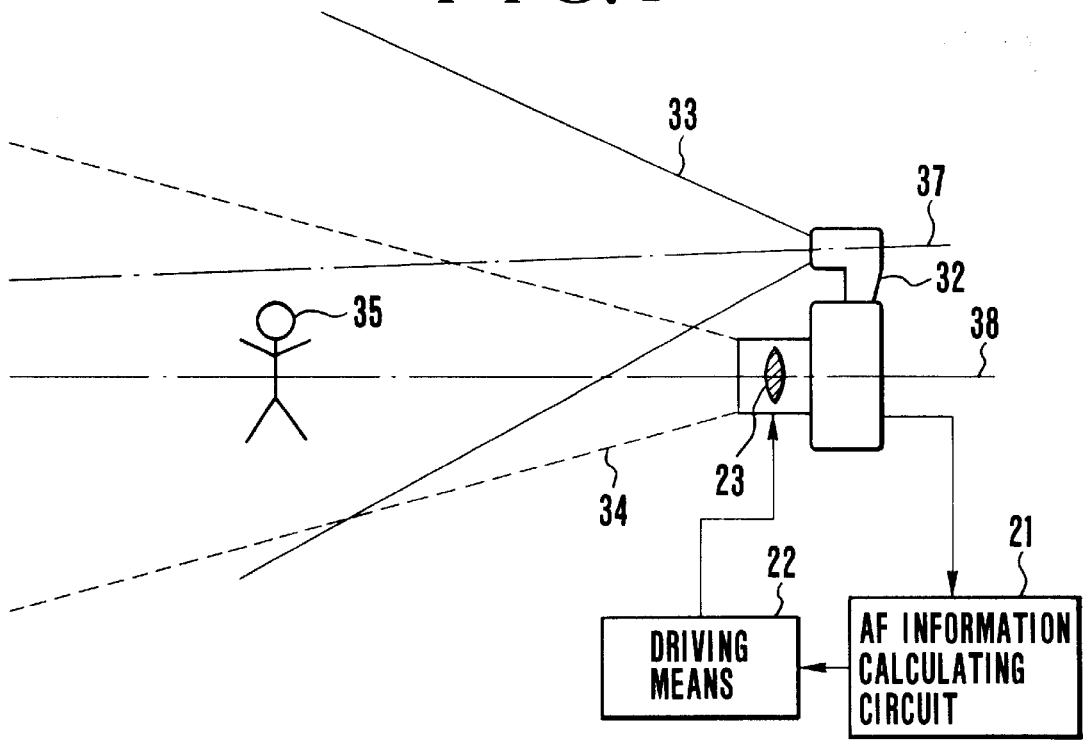
FIG. 4 is a schematic view showing the relationship between a photographic optical axis and a flash optical axis before the device according to the first embodiment of the present invention is operated.
Figure 5:
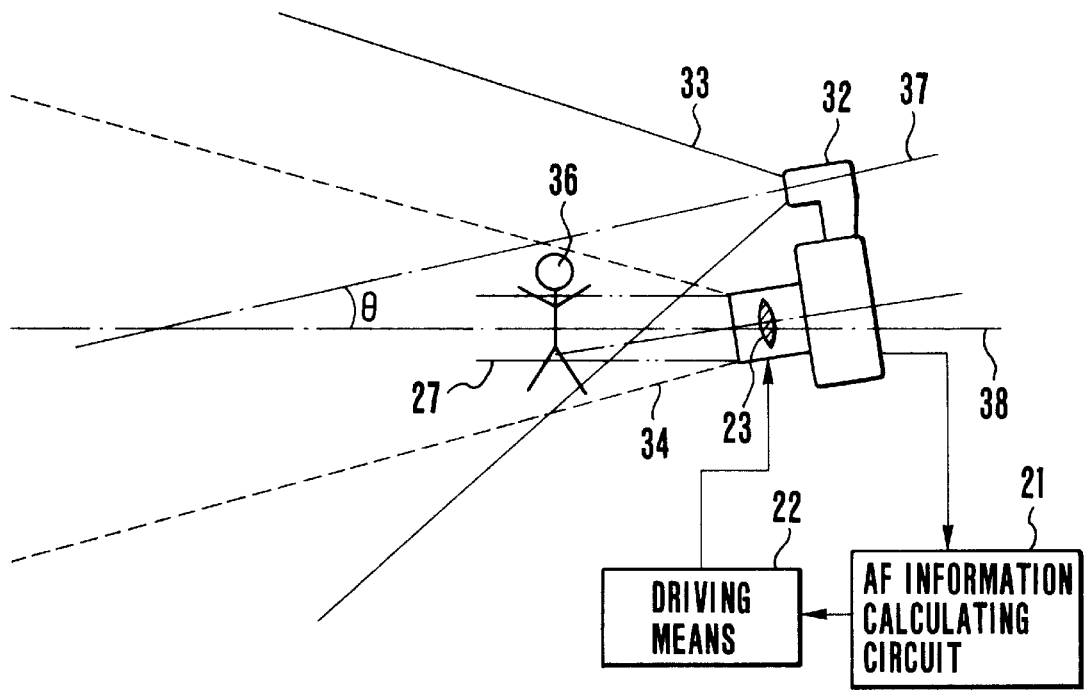
FIG. 5 is a schematic view showing the relationship between the photographic optical axis and the flash optical axis when the device according to the first embodiment of the present invention is operated.
Figure 20:
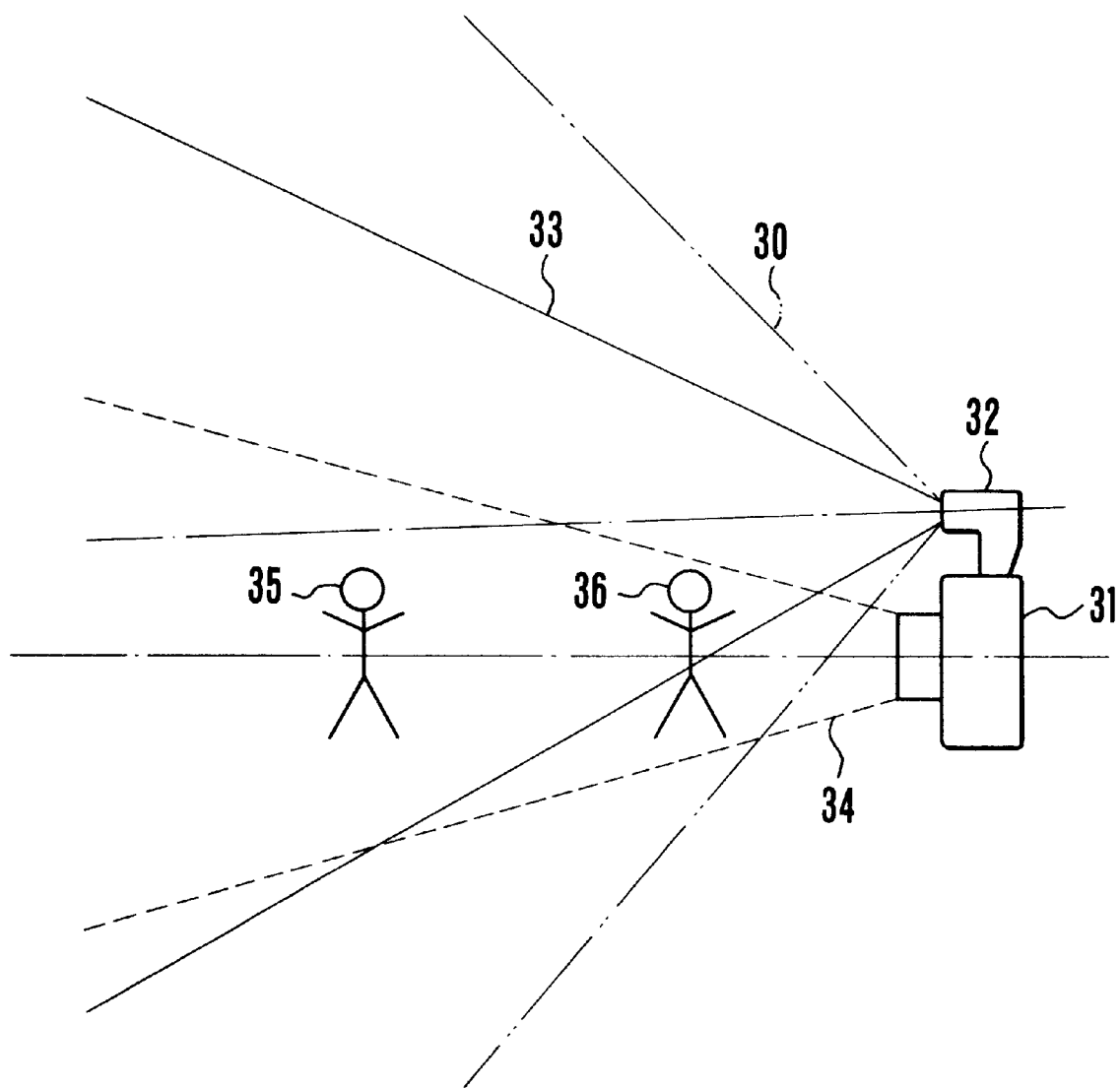
FIG. 20 is a schematic view which serves to explain problems regarding a flash illumination area and a photographic area, which are experienced with a conventional camera when the distance to a subject is closest.

Different cases in which photography is performed by using a flash unit together with a camera provided with either of the above-described flash-illumination-area controlling devices will be described below with reference to FIGS. 4 and 5. In FIGS. 4 and 5, the same reference numerals are used to denote portions identical to those shown in FIG. 20.

FIG. 4 shows a photography example which is performed when there is a subject at a normal position indicated at 35 (for example, at a position away from the camera by 1.2 m). In this example, a known AF information calculating circuit 21 of the camera calculates AF information indicating that the subject is not located at a closest-distance position, and does not output anything to driving means 22. (Incidentally, in FIG. 4, for ease of understanding, the AF information calculating circuit 21 is shown as if it were provided outside of the camera. In practice, however, the AF information calculating circuit 21 is provided in the camera. Similarly, the driving means 22 is provided in the camera, or if a correcting optical system 23 is provided in an interchangeable lens, the driving means 22 is also provided therein.) Accordingly, the correcting optical system 23 (for example, the correcting lens 11) is not driven by the driving means 22, and photography is performed in the conventional manner.

If the subject is located at a closest-distance position indicated at 36, as shown in FIG. 5, the AF information calculating circuit 21 calculates AF information indicating that the subject is located at the closest-distance position, and transmits to the driving means 22 a signal corresponding to the AF information for making the correcting optical system 23 eccentric. The driving means 22 makes the correcting optical system 23 eccentric on the basis of the signal so that an angle θ made by a photographic optical axis 38 and a flash optical axis 37 becomes larger.

Since the above-described camera adopts a TTL viewfinder, even if the photographic optical axis 38 is made eccentric, a photographer involuntarily inclines the camera obliquely to correctly aim at the subject within the viewfinder. Accordingly, the illumination area of a flash unit 32 is shifted relatively downward with respect to the subject so that even if the subject is located at the closest-distance position, flash light can cover the whole subject (the entire area which can be photographed in a film plane).

Accordingly, even in the case of closet-distance photography using the flash unit 32, it is possible to prevent occurrence of a portion insufficiently illuminated with flash light. Further, it is possible to solve the problem of the conventional example, i.e., the ineffective (or inefficient) use of flash light resulting from the enlargement of a flash illumination angle for the purpose of preventing a portion insufficiently illuminated with flash light from occurring when a subject is located at the closet-distance position.

Although the above description has referred to the arrangement in which the correcting optical system 23 is automatically driven by an actuator, the correcting optical system 23 may also be driven by transmitting an AF driving force thereto (for example, an AF driving motor is coupled to correcting optical means).

(Second Embodiment)

Figure 6:
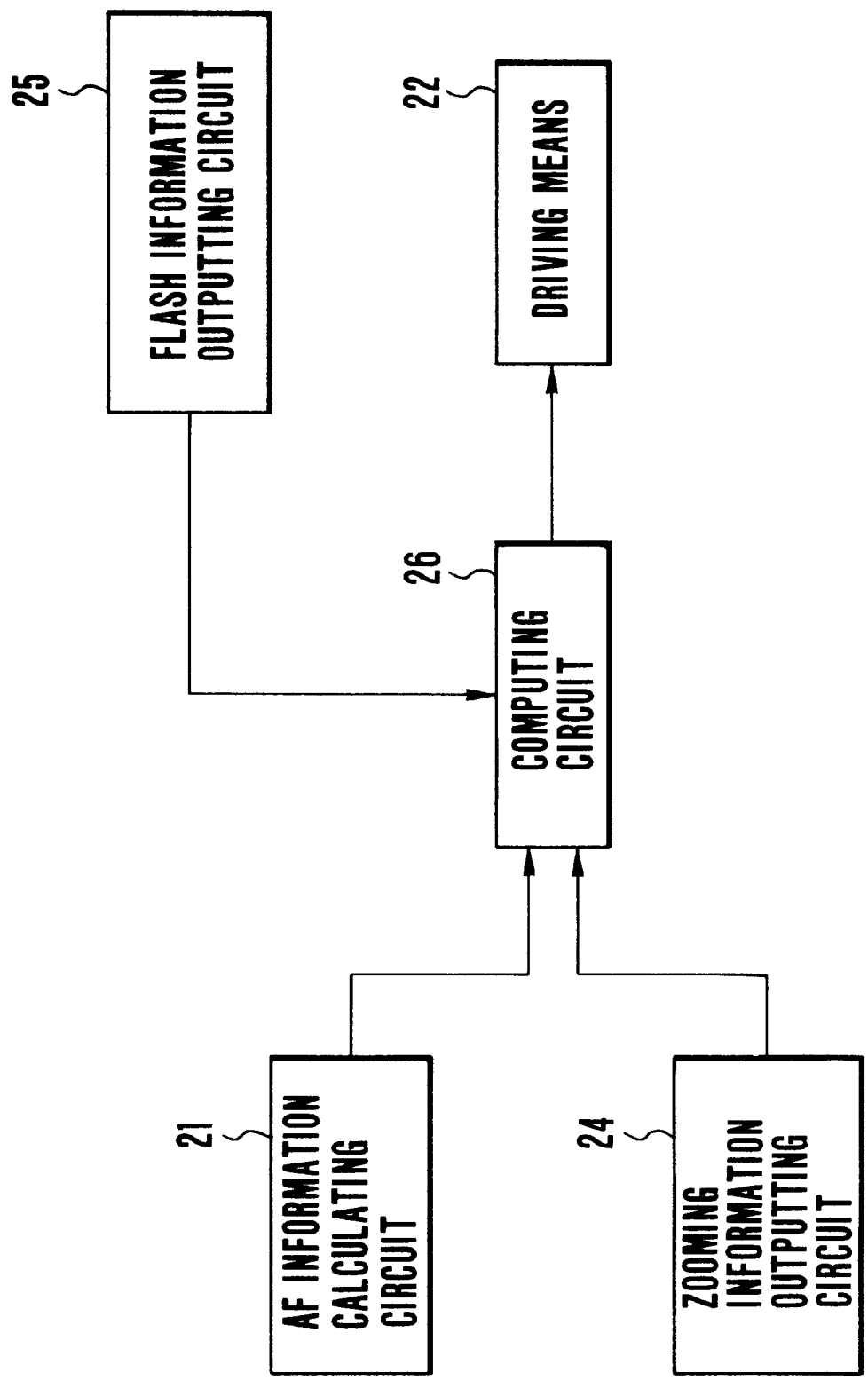
FIG. 6 is a block diagram of the arrangement of the essential portions of a flash-illumination-area controlling device, showing a second embodiment of the present invention.

FIG. 6 shows a block diagram showing the arrangement of the essential portions of a camera according to a second embodiment of the present invention.

In the second embodiment, a computing circuit 26 calculates a deflecting signal for making the correcting optical system 23 eccentric, which is to be supplied to the driving means 22, on the basis of not only the aforesaid AF information but also zooming information supplied from a zooming information outputting circuit 24 as well as information from a flash information outputting circuit 25 which indicates that flash photography is selected. The calculated deflecting signal is transmitted to the driving means 22 so as to drive the correcting optical system 23.

As described previously, if wide-angle setting (for example, a focal length of 35 mm) is selected and if a subject is located at the closest-distance position, the area of the portion insufficiently illuminated with flash light is largest. In this case, the correcting optical system 23 is made to move to a large extent. If telephoto setting (for example, a focal length of 100 mm) is selected and if a subject is located at the closest-distance position, the size of the portion insufficiently illuminated with flash light is small since an angle of view for photography is small. In this case, the correcting optical system 23 is made to move to a small extent. If the flash unit 32 is not used, since information to that effect is inputted from the flash information outputting circuit 25 to the computing circuit 26, the computing circuit 26 does not perform calculation of a deflecting signal, and does not output anything to the driving means 22. Accordingly, the correcting optical system 23 is not driven.

With the above-described arrangement, it is possible to reduce the power consumption of the correcting optical mechanism since the correcting optical system 23 is not frequently driven.

Figure 7:
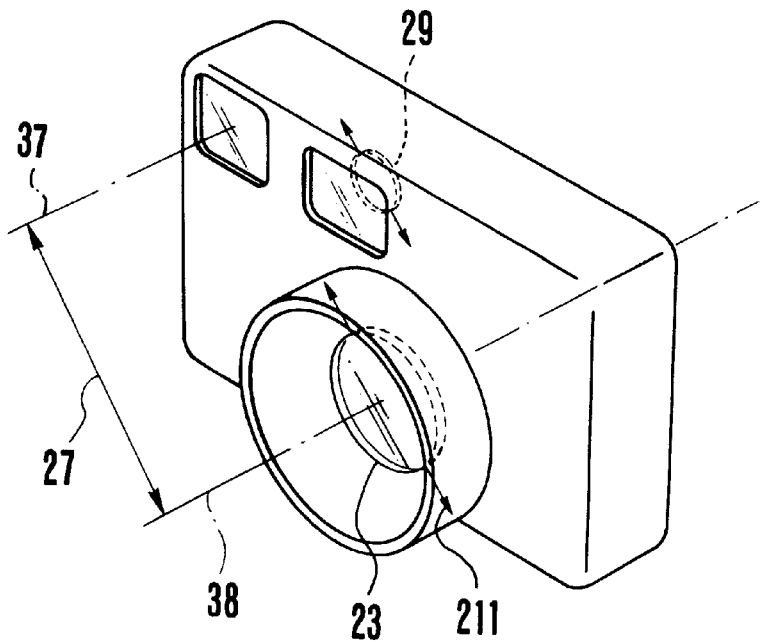
FIG. 7 is a schematic perspective view of a camera provided with the flash-illumination-area controlling device according to the first or second embodiment, the camera having a flash optical axis and a photographic optical axis which extend in diagonal relation.

In each of the above-described embodiments, as shown in each of FIGS. 4 and 5, it is assumed that the optical axis 37 of the flash unit 32 and the photographic optical axis 38 extend in a plane containing the sheet surface of each of FIGS. 4 and 5, and the correcting optical system 23 is driven in such a plane (in the plane containing the sheet surface and in the direction perpendicular to the photographic optical axis 38). However, if the flash optical axis 37 and the photographic optical axis 38 extend in an oblique plane as shown in FIG. 7, it is necessary to make the photographic optical axis 38 eccentric in the plane containing the flash optical axis 37 and the photographic optical axis 38, and the photographic optical axis 38 is, therefore, made eccentric in the direction of a double-headed arrow 27. Accordingly, the correcting optical system 23 is driven in the direction of a double-headed arrow 211. Also, in a case where the flash-illumination-area controlling device is made from a variable angle prism 210 as shown in FIG. 8, the variable angle prism 210 is made eccentric in the direction of the double-headed arrow 27 by rotating the variable angle prism 210 in the direction of a double-headed arrow 28 about the photographic optical axis 38 and inclining a flat plate of the variable angle prism 210.

Figure 8:
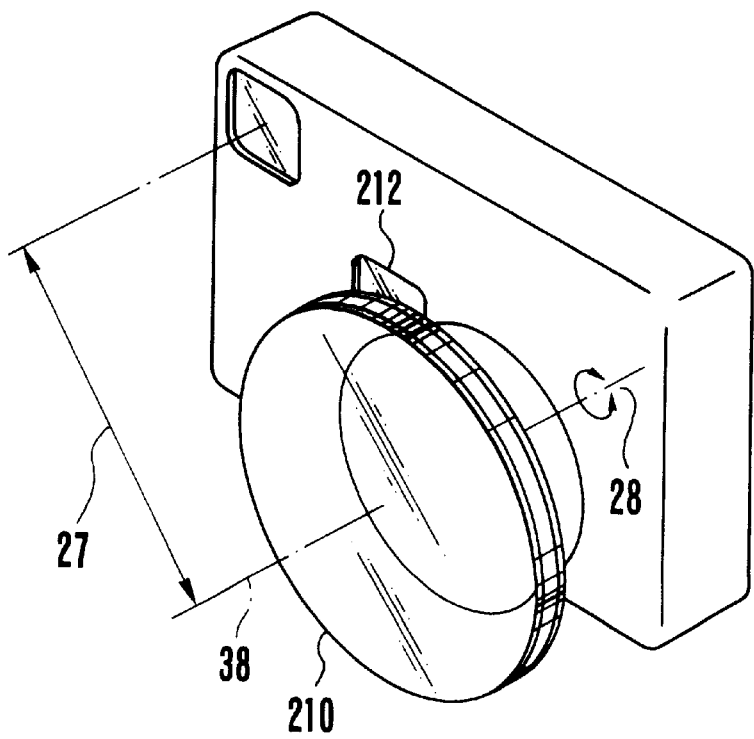
FIG. 8 is a schematic perspective view of a camera in which the correcting optical system of FIG. 7 is constructed by using a variable angle prism.

The cameras shown in FIGS. 7 and 8 are examples of an external-viewfinder camera. In the case of the external-viewfinder camera, to inform a photographer that the photographic optical axis 38 is made eccentric, a frame displayed within the viewfinder may be switched, or a correcting optical system 29 may be provided in a viewfinder optical path as shown in FIG. 7. Alternatively, a viewfinder window 212 may be provided at the back of the correction area of the variable angle prism 210.

(Third Embodiment)

The third embodiment pertains to a camera provided with an image stabilizing function for suppressing an image shake due to a camera shake by making a photographic optical axis eccentric in a similar manner, in addition to a function for executing the above-described flash-illumination-area control.

In general, a camera shake which occurs during photography is a vibration which normally has a frequency range of 1 Hz to 12 Hz, and it is desirable that a photograph free from an image shake can be taken even if such a camera shake occurs at the time when the shutter of the camera is released. As a basic concept for realizing such an operation, it is necessary to provide an art for detecting the above-described vibration of the camera due to the camera shake and displacing a correcting lens in accordance with the value of the detected vibration. According, to achieve an art for making it possible to effect photography free from an image shake even if a camera shake occurs, it is first necessary to accurately detect the vibration of the camera and it is then necessary to correct the variation of the optical axis due to the camera shake.

In principle, the detection of the vibration (camera shake) can be realized by providing a camera with a vibration sensor for detecting an angular acceleration, an angular velocity, an angular displacement or the like and camera-shake detecting means for electrically or mechanically integrating the output signal of the vibration sensor and outputting an angular displacement. On the basis of the detection information, a correcting optical mechanism for making a photographic optical axis eccentric is driven to effect image-shake suppression.

The essential arrangement of an image stabilizing system using an angular displacement detecting device will be described with reference to FIG. 9.

Figure 9:
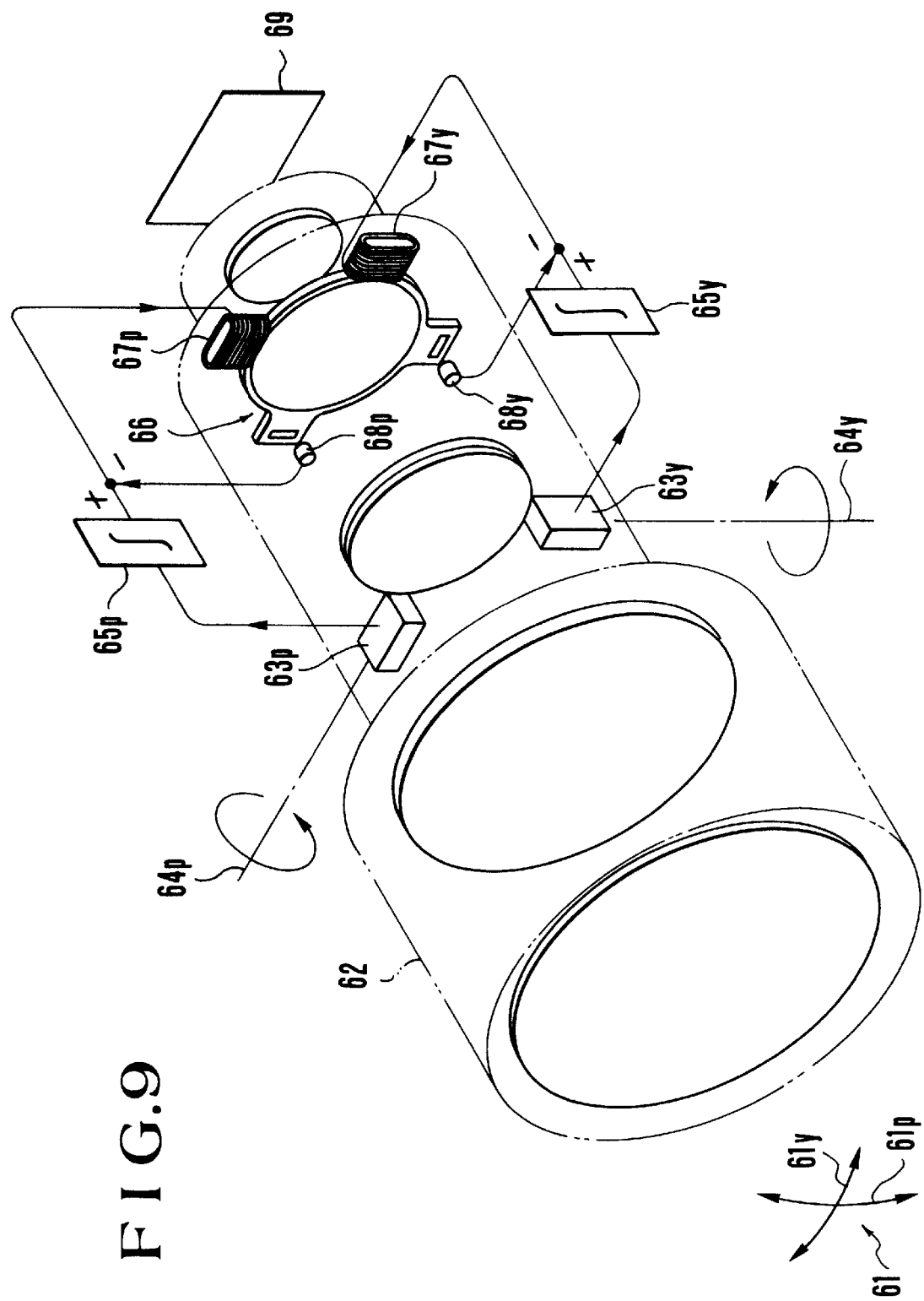
FIG. 9 is a schematic perspective view showing the arrangement of the essential portions of a third embodiment of the present invention.

The example shown in FIG. 9 is a system for suppressing an image shake which derives from a camera pitch 61*p* and a camera yaw 61*y* as indicated by curved double-headed arrows denoted collectively at 61.

The shown example includes a lens barrel 62, angular displacement detecting devices 63*p* and 63*y* for respectively detecting a camera's vertical shake angular displacement and a camera's horizontal shake angular displacement, the directions of detection of the respective angular displacements being indicated by 64*p* and 64*y*, and computing circuits 65*p* and 65*y* for computing signals inputted from the respective angular displacement detecting devices 63*p* and 63*y* and converting the signals into correcting optical system driving signals. In accordance with the correcting optical system driving signals, a correcting optical mechanism 66 (including driving parts 67*p* and 67*y* and correcting optical position detecting sensors 68*p* and 68*y*) is driven to ensure image stabilization in an image plane 69.

FIGS. 10 through 14 show one arrangement example of the angular displacement detecting device which serves as the above-described vibration sensor. The angular displacement detecting device will be described below with reference to these figures.

The angular displacement detecting device shown in FIGS. 10 through 13 includes a base plate 51 to which various parts constituting the device are secured in position, and a cylindrical container 52 having a chamber in which are enclosed a floating element 53 and a liquid 54 both of which will be described later. The floating element 53 is held rotatably about an axis 53*a* by a floating-element holder 55 which will be described later, and has a projection 53*b* on which a slit-shaped reflecting surface is formed. Also, the floating element 53 is made of a permanent-magnet material and is magnetized in a direction parallel to the axis 53*a*. The floating element 53 is arranged in such a manner as to maintain the balance of rotation about the axis 53*a* and the balance of buoyancy in the liquid 54.

The angular displacement detecting device shown in FIGS. 10 through 13 also includes the floating-element holder 55 which is fixed to the cylindrical container 52 in the state of holding the floating element 53 by means of pivot bearings 56 which will be described later, a U-shaped yoke 57 which is attached to the base plate 51 and forms a closed magnetic path in cooperation with the floating element 53, a wound coil 514 which is disposed between the floating element 53 and the yoke 57 in fixed relation to the cylindrical container 52, a light emitter (iRED) 58 which is energized to emit light and which is attached to the base plate 51, and a light receiver (PSD) 59 the output of which varies in accordance with the position in which light is received and which is attached to the base plate 51. The light emitter 58 and the light receiver 59 constitute optical angular displacement detecting means of the type in which light is transmitted via the projection (reflecting surface) 53b of the floating element 53.

A mask 510 is disposed in front of the light emitter 58, and has a slit 510a through which light is transmitted. A stopper member 511 is attached to the cylindrical container 52 to limit the rotation of the floating element 53 so that the floating element 53 is prevented from rotating beyond a predetermined range.

The rotatable holding of the floating element 53 is realized in the following manner. Sharp-pointed pivots 512 are respectively press-fitted into the upper and lower end faces of the floating element 53 along the central axis thereof as shown in FIG. 11 (a sectional view taken along line 11—11 of FIG. 10). The pivot bearings 56 are respectively provided at the extending ends of the upper and lower arms of the U-shaped floating-element holder 55 in the state of being opposed to each other in the inward direction. The sharp-pointed ends of the pivots 512 are respectively engaged with the pivot bearings 56 to hold the floating element 53.

A lid 513 is bonded to the cylindrical container 52 in a sealed manner by a known art utilizing a silicone adhesive or the like so that the liquid 54 is enclosed in the cylindrical container 52.

In the above-described arrangement, the floating element 53 has a symmetrical shape relative to the rotational axis 53a and is formed of a material having the same specific gravity as the liquid 54 so that an angular moment due to the influence of gravitation is prevented from occurring whatever attitude the floating element 53 may take and also so that a load is prevented from substantially acting on the pivot bearings 56. Although it is actually impossible to reduce unbalance components to zero, errors in shape are substantially extremely small since only differences in specific gravity give rise to unbalance. Accordingly, it will be readily understood that the S/N ratio of friction to inertia is extremely high.

In the above-described arrangement, even if the cylindrical container 52 rotates about the rotational axis 53a, the liquid 54 inside the cylindrical container 52 is stationary with respect to absolute space owing to inertia. Accordingly, the floating element 53 which is in a floating state does not rotate, and the cylindrical container 52 and the floating element 53 rotate about the rotational axis 53a with respect to each other. Such relative angular displacement can be detected by the optical detecting means utilizing the light emitter 58 and the light receiver 59.

In the device having the above-described arrangement, the detection of the angular displacement is performed in the following manner.

Light emitted from the light emitter 58 passes through the slit 510a of the mask 510 and is projected onto the floating element 53, and the projected light is reflected by the slit-shaped reflecting surface of the projection 53b and reaches the light receiver 59. During this light transmission, the light is made approximately parallel light by the slit 510a and the slit-shaped reflecting surface, whereby an image which is not blurred is formed on the light receiver 59.

The cylindrical container 52, the light emitter 58 and the light receiver 59 are all fixed to the base plate 51 and therefore move integrally. If a relative angular displacement occurs between the cylindrical container 52 and the floating element 53, the slit image formed on the light receiver 59 moves by an amount corresponding to the relative angular displacement. Accordingly, the output of the light receiver 59, which is a photoelectric conversion device the output of which varies with the position where light is received, is proportional to the positional displacement of the slit image, whereby it is possible to detect the angular displacement of the cylindrical container 52 by utilizing the aforesaid output as information.

As described above, the floating element 53 is made of a permanent-magnet material having the same specific gravity as the liquid 54. The permanent-magnet material is prepared, for example, in the following manner.

In a case where a fluorine-based inactive liquid is used as the liquid 54, if a finely powdered permanent-magnet material (for example, ferrite) is prepared as a filler and is contained in a plastics material prepared as a base and the content of the finely-powdered permanent-magnet material is adjusted, it is possible to easily prepare a material having a specific gravity approximately equal to the specific gravity of the liquid 54 (1.8) in the neighborhood of a volume content of 8%. If the floating element 53 is magnetized along the axis 53a after it has been formed of such a material or at the same that it is formed of the material, the floating element 53 will have the nature of a permanent magnet.

Figure 10:
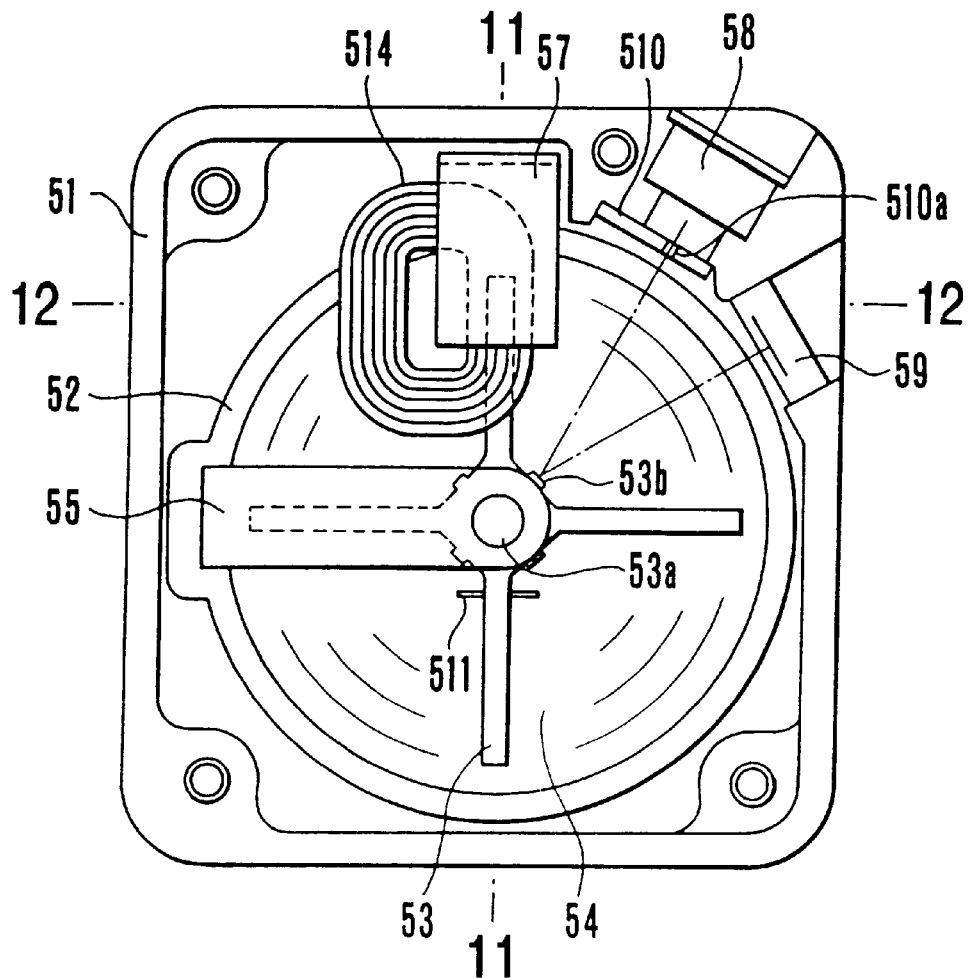
FIG. 10 is a diagrammatic plan view showing an angular displacement detecting device which is one example of vibration detecting means according to the third embodiment of the present invention.
Figure 11:
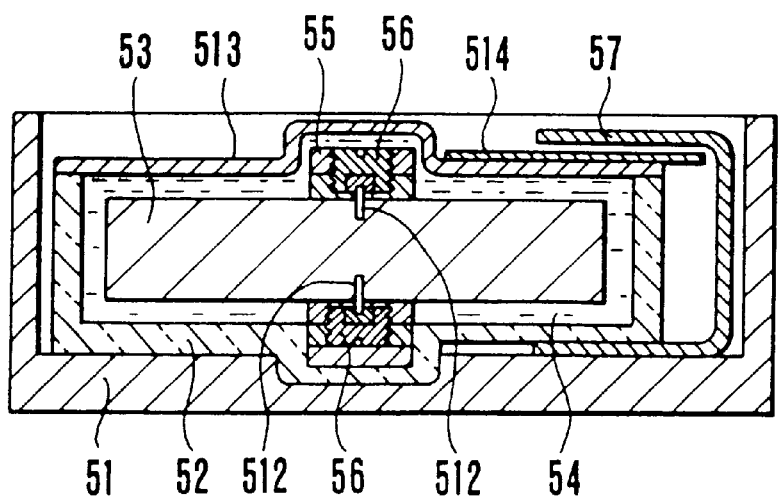
FIG. 11 is a cross-sectional view taken along line 11—11 of FIG. 10.
Figure 12:
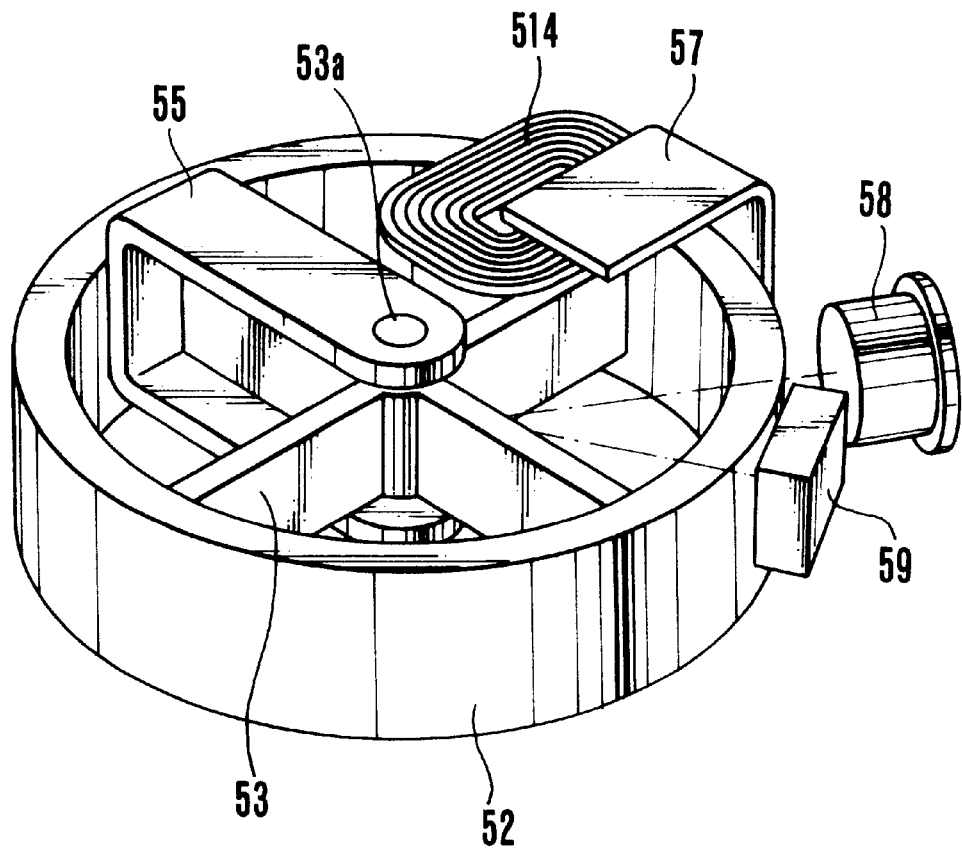
FIG. 12 is a diagrammatic perspective view of the angular displacement detecting device shown in FIG. 10.
Figure 13:
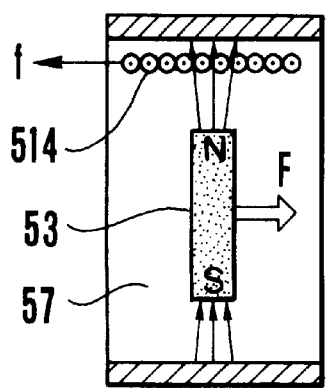
FIG. 13 is a cross-sectional view taken along line 13—13 of FIG. 10.

FIG. 13 is a sectional view taken along line 13—13 of FIG. 10, representing the relations between the floating element 53, the yoke 57 and the wound coil 514.

As shown, the floating element 53 is magnetized along the axis 53a, and the upper side and the lower side are respectively magnetized as a north pole and an south pole, as shown in FIG. 13. A closed magnetic path is formed along which the magnetic lines of force exiting from the north pole pass through the yoke 57 of U-like cross section and reach the south pole. If an electric current is made to flow from the reverse side to the obverse side of the sheet of FIG. 13 through the wound coil 514 disposed in the magnetic path, the wound coil 514 is subject to a force in the direction of an arrow "f" in accordance with Fleming's left-hand rule. However, the wound coil 514 does not move because it is fixed to the cylindrical container 52 as described previously, with the result that a force works as a reaction in the direction of an arrow F and the floating element 53 is driven by the force. Needless to say, this force is proportional to the electric current flowing in the wound coil 514 and the direction of the force is reversed if an electric current is made to flow in the opposite direction. Therefore, according to the arrangement described above, it is possible to freely drive the floating element 53.

A spring force which is exerted on the floating element 53 by the above-described driving force is theoretically a force which maintains the floating element 53 in a fixed attitude with respect to the cylindrical container 52 (that is, a force which moves the floating element 53 integrally with the cylindrical container 52). If such a spring force is excessively strong, the cylindrical container 52 and the floating element 53 move integrally, thus resulting in the problem that a relative angular displacement for a desired angular displacement is not produced. However, if the driving force (spring force) is made sufficiently small with respect to the inertia of the floating element 53, it is possible to realize an arrangement which is also capable of responding to an angular displacement of relatively low frequency.

Figure 14:
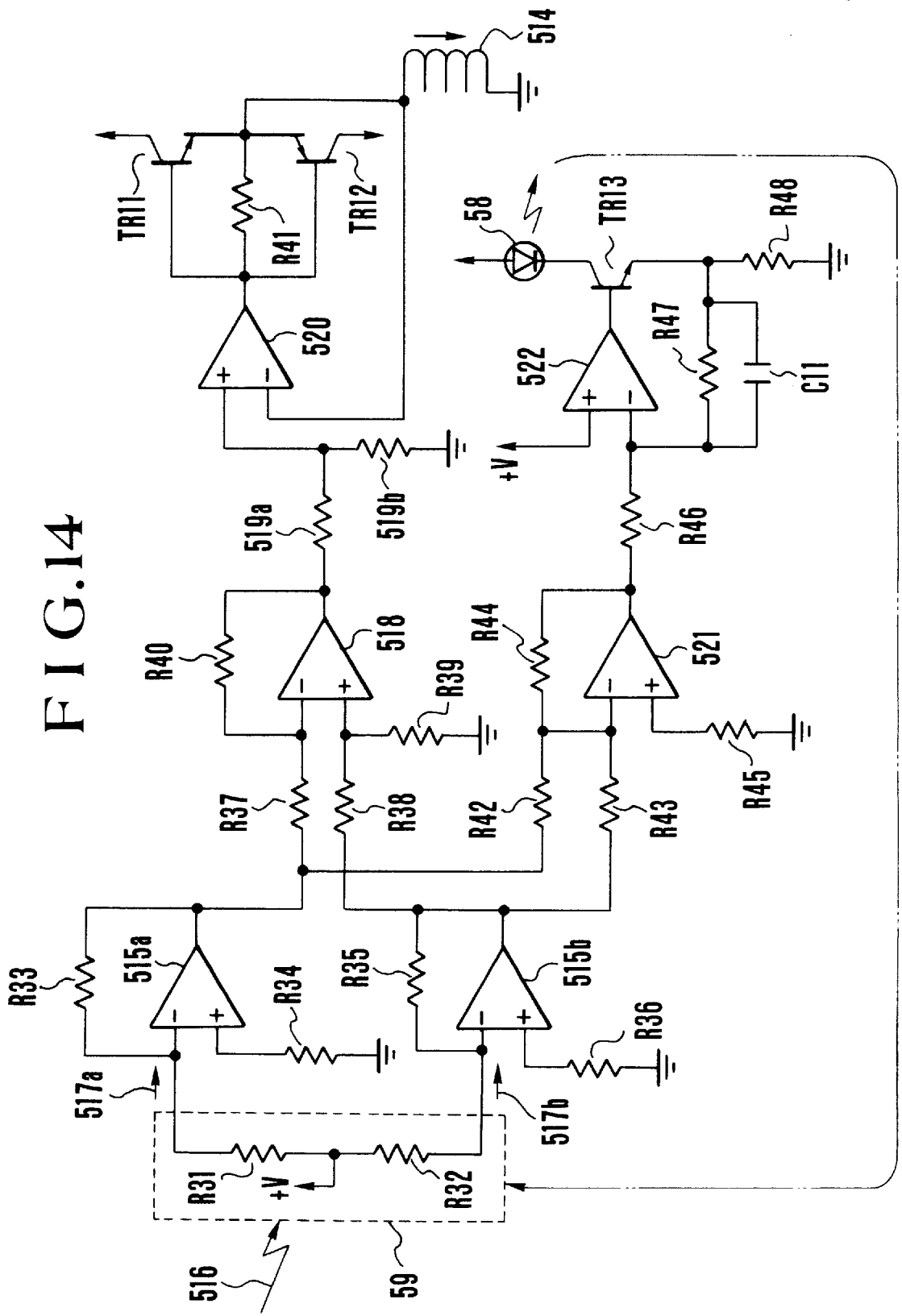
FIG. 14 is a circuit diagram showing the electrical construction of the angular displacement detecting device shown in FIG. 10.

FIG. 14 is a diagram showing the electrical circuit of the above-described angular displacement detecting device.

Current-voltage conversion amplifiers 515a and 515b (as well as resistors R33 to R36) convert photoelectric currents 517a and 517b, which are produced in the light receiver 59 by reflected light 516 from the light emitter 58, into corresponding voltages, and a differential amplifier 518 (as well as resistors R37 to R40) finds the difference between the outputs of the current-voltage conversion amplifiers 515a and 515b, i.e., an angular displacement (a relative angular displacement motion between the cylindrical container 52 and the liquid 53). The output of the differential amplifier 518 is divided into an extremely small output by resistors 519a and 519b. The extremely small output is inputted to the driving amplifier 520 (as well as a resistor R41 and transistors TR11 and TR12) for causing an electric current to flow through the wound coil 514, thereby carrying out negative feedback (the manner of wiring of the wound coil 514 and the direction of magnetization of the floating element 53 are set so that, when the differential amplifier 518 provides an output, the floating element 53 returns to its central position). Thus, a substantially small spring force (driving force) is produced with respect to the inertia of the liquid 54 in the above-described manner.

An adder amplifier 521 (as well as resistors R42 to R45) finds the sum of the outputs of the current-voltage conversion amplifiers 515a and 515b (the total amount by which the reflected light 516 from the light emitter 58 has been received by the light receiver 59), and the output of the adder amplifier 521 is inputted to a driving amplifier 522 (as well as resistors R47, R48, a transistor TR13 and a capacitor C11) for causing the light emitter 58 to emit light.

The light emitter 58 tends to vary extremely unstably the amount of emission thereof with temperature differences. However, by driving the light emitter 58 on the basis of the total amount of received light in the above-described manner, the total amount of photoelectric current outputted from the light receiver 59 is kept constant at all times, whereby it is possible to highly stabilize the angular-displacement detection sensitivity of the differential amplifier 518.

Figure 15:
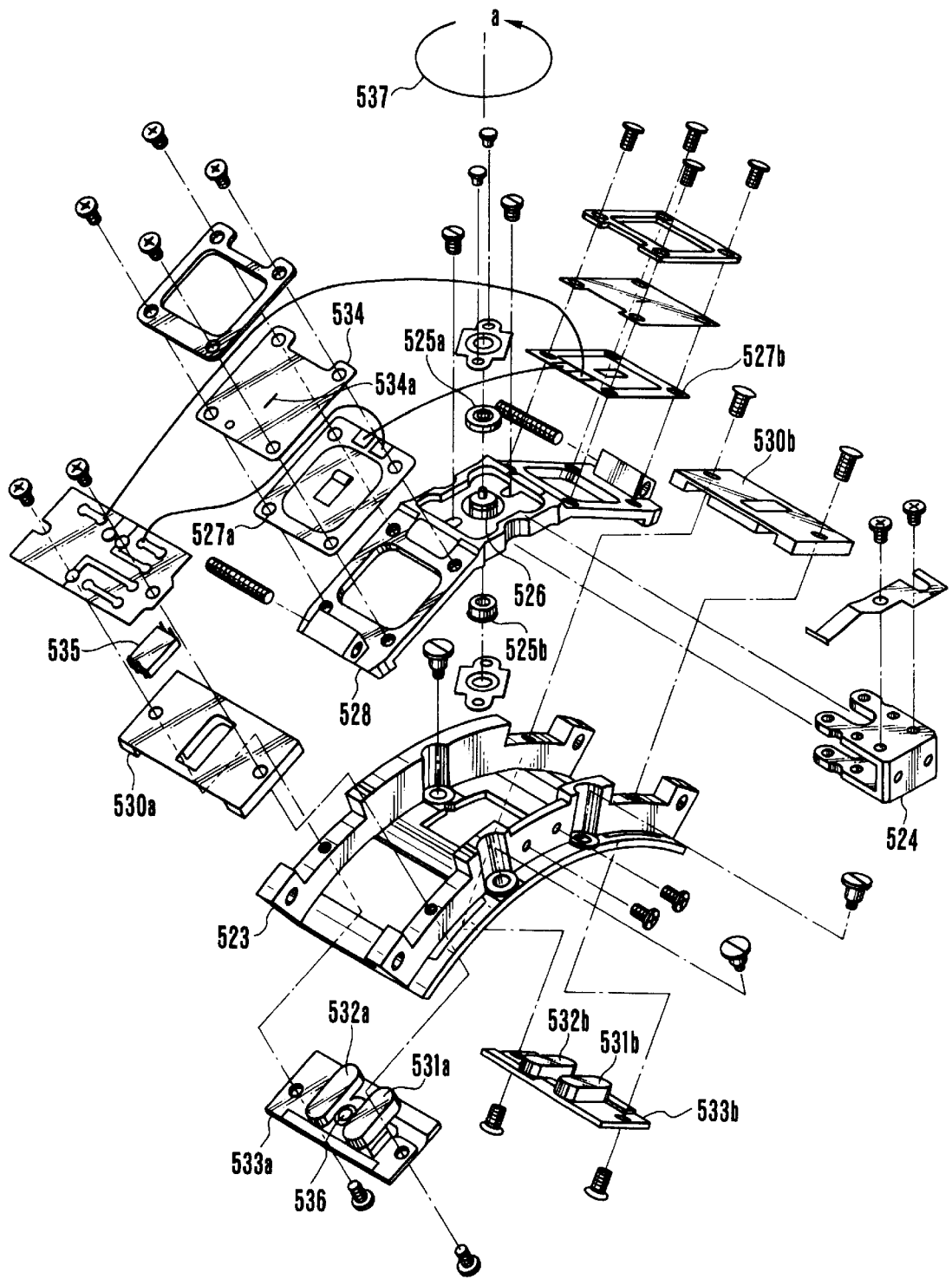
FIG. 15 is a diagrammatic, exploded perspective view showing the arrangement of a servo angular acceleration sensor which is another example of the vibration detecting means according to the third embodiment of the present invention.

FIG. 15 shows the structure of a servo angular acceleration sensor which is another type of vibration sensor.

Referring to FIG. 15, a support part 524 is integrally fixed to an external-frame bottom 523, and a shaft 526 is supported at its opposite ends by the support part 524 as well as small-friction bearings 525a and 525b, such as ball bearings. A seesaw 528 to which coils 527a and 527b are attached is swingably supported by the shaft 526.

Magnetic circuit plates 530a and 530b each of which serves as a lid are spaced apart from and disposed above the coils 527a, 527b and the seesaw 528, while permanent magnets 531a, 532a and 531b, 532b are spaced apart from and disposed below the coils 527a, 527b and the seesaw 528. The magnetic circuit plate 530a is opposed to the permanent magnets 531a and 532a, while the magnetic circuit plate 530b is opposed to the permanent magnets 531b and 532b. As described above, the magnetic circuit plates 530a and 530b also serve as the lids for the external-frame bottom 523. The permanent magnets 531a, 532a and 531b, 532b are respectively mounted on magnetic circuit back plates 533a and 533b which are fixed to the external-frame bottom 523.

A slit plate 534 in which a slit 534a is formed to extend therethrough in the thickness direction is provided above the coil 327a of the seesaw 528. A photoelectric type of displacement detector 535, such as an SPC (Separate Photo Diode), is disposed on the magnetic circuit plate 530a which is positioned above the slit 534a and which also serves as the lid for the external-frame bottom 523. A light emitter 536, such as an infrared emission diode, is disposed on the magnetic circuit back plate 533a which is positioned below the slit 534a.

In the above-described arrangement, if it is assumed that an angular acceleration "a" works as indicated by an arrow 537 with respect to the external-frame bottom 523 of FIG. 15, the seesaw 528 relatively swings in the direction opposite to the direction in which the angular acceleration "a" works. The angle of this swing can be detected from the position on the displacement detector 535 of a beam transmitted from the light emitter 536 through the slit 534a.

Magnetic fluxes from the individual permanent magnets 531a and 531b flow through the permanent magnets 531a and 531b→the coils 527a and 527b→the magnetic circuit plates 530a and 530b→the coils 527a and 527b→the permanent magnets 531a and 531b, respectively. Magnetic fluxes from the individual permanent magnets 532a and 532b flow the permanent magnets 532a and 532b→the magnetic circuit back plates 533a and 533b→the permanent magnets 532a and 532b, respectively. Thus, these magnetic fluxes form a closed magnetic circuit as a whole and are respectively formed as magnetic fluxes acting in directions perpendicular to the coils 527a and 527b. By causing a control electric current to flow through the coils 527a and 527b, it is possible to move the seesaw 528 toward either end according to the direction of the swing provided by the angular acceleration "a", in accordance with Fleming's left-hand rule.

Figure 16:
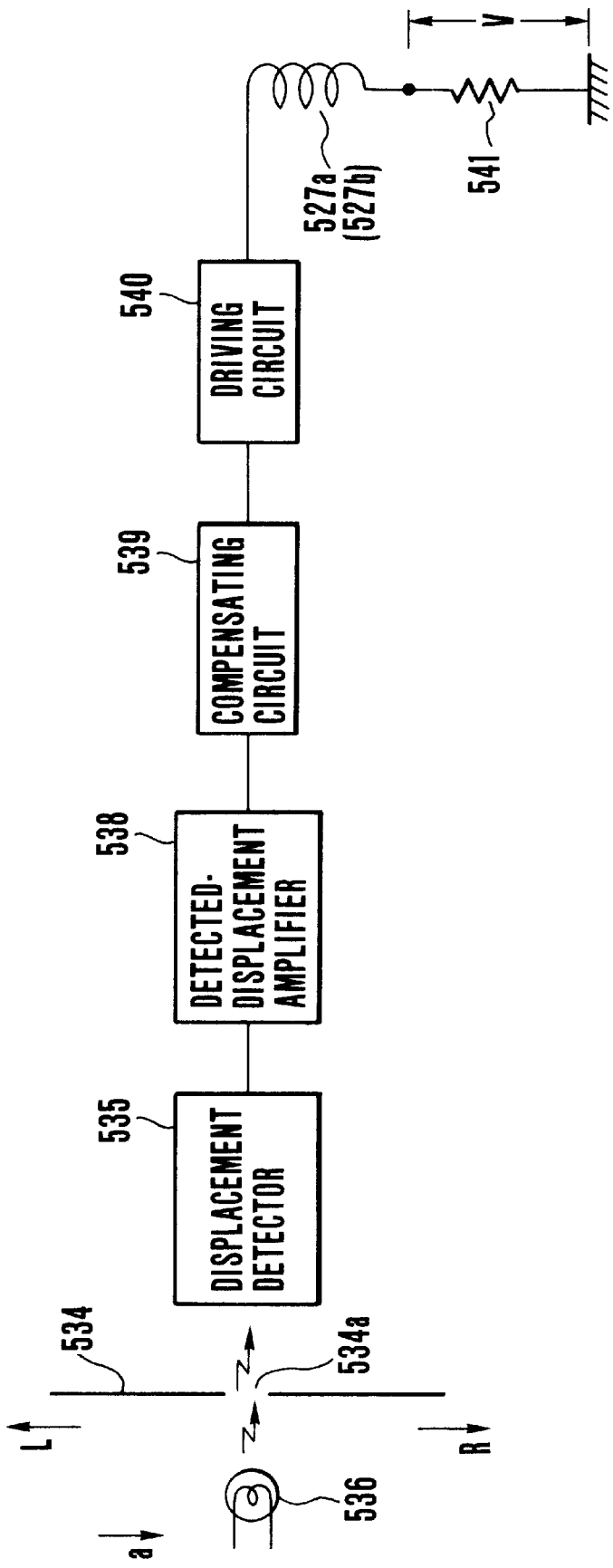
FIG. 16 is a block diagram showing the electrical arrangement of the servo angular acceleration sensor shown in FIG. 15.

FIG. 16 shows one example of the arrangement of an angular acceleration detecting circuit for use in the servo angular acceleration sensor having the above-described arrangement.

The angular acceleration detecting circuit includes a detected-displacement amplifier 538 for amplifying the output from the displacement detector 535, a compensating circuit 539 for enabling this feedback circuit to serve as a stable circuit, a driving circuit 540 for amplifying the amplified output of the detected-displacement amplifier 538 to a further amplified level of electric current and energizing the coils 527a and 527b, and the coils 527a and 527b. The displacement detector 535, the detected-displacement amplifier 538, the compensating circuit 539, the driving circuit 340 and the coils 527a and 527b are connected in series.

In this example, the direction of winding of each of the coils 527a and 527b and the polarity of each of the permanent magnets 531a, 531b, 532a and 532b are set so that if the coils 527a and 527b are energized, a force is produced in the direction opposite to the direction in which the seesaw 528 is swung by the external angular acceleration "a".

The operational principle of the servo angular acceleration sensor having the above-described arrangement will be described below. If it is assumed that the angular acceleration "a" is externally applied to the angular acceleration sensor having the above-described arrangement as shown in FIG. 16, the seesaw 528 swings by inertial force with respect to the external-frame bottom 523 in the direction opposite to the direction of the angular acceleration "a", whereby the slit 534a provided on the seesaw 528 moves in an L direction. Accordingly, the center of a light flux which is incident on the displacement detector 535 from the light emitter 536 is displaced, and the displacement detector 535 produces an output proportional to the amount of the displacement.

The output is amplified by the detected-displacement amplifier 538 as described above, and the output of the detected-displacement amplifier 538 is applied to the driving circuit 540 through the compensating circuit 539. The driving circuit 540 amplifies the input from the compensating circuit 539 to a further amplified level of electric current and energizes the coils 527a and 527b.

As described above, when the control electric current is made to flow through the coils 527a and 527b, the seesaw 528 is subjected to a force which acts in an R direction opposite to the L direction of the external angular acceleration "a", and the control electric current is produced in the state of being adjusted so that the center of the light flux which is incident on the displacement detector 535 returns to its initial position where the center of the light flux is located when the external angular acceleration "a" is not acting.

The value of the control electric current which flows through the coils 527a and 527b during this time is proportional to a rotational force applied to the seesaw 528. Furthermore, the rotational force applied to the seesaw 528 is proportional to a force which tends to return the seesaw 528 to its original position, i.e., the magnitude of the external angular acceleration "a". Accordingly, by reading an electric current as a voltage V through a resistor 541, it is possible to find the magnitude of the angular acceleration "a" as the control information required for, for example, the image-shake correcting system of a camera.

Then, the thus-obtained angular acceleration output is converted into an angular displacement output through integration of second order by a known analog or digital integrating circuit, thereby providing an image-shake output.

Figure 17:
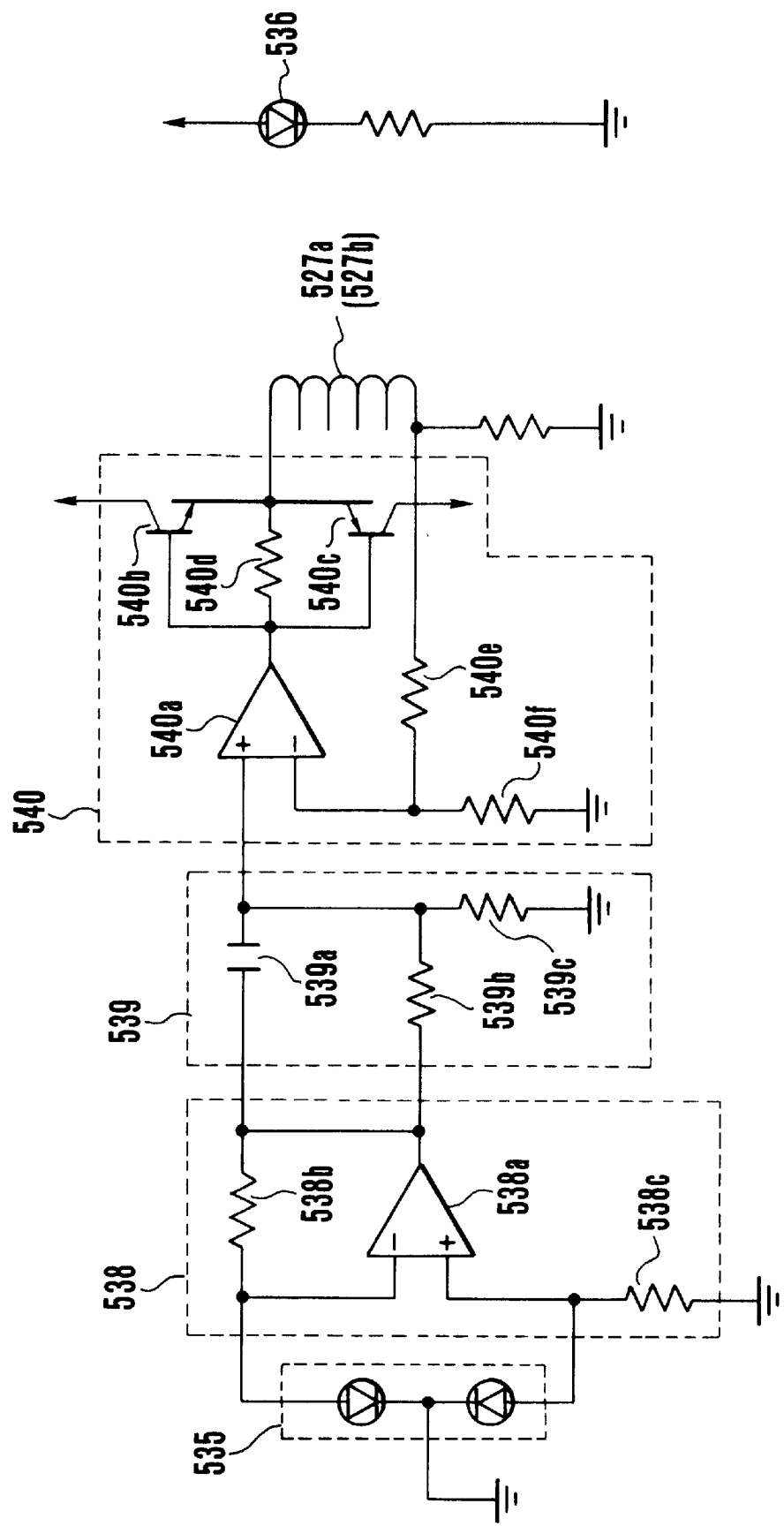
FIG. 17 is a circuit diagram concretely showing the electrical arrangement of FIG. 16.

FIG. 17 is a diagram showing more concretely the angular acceleration detecting circuit shown in FIG. 16.

In FIG. 17, an amplifier 538a and resistors 538b and 538c constitute the detected-displacement amplifier 538 of FIG. 16 and perform position detection by converting a photo-electric current from the displacement detector 535 into an amplified voltage. A capacitor 539a and resistors 539b and 539c constitute the compensating circuit 539. A driving amplifier 540a, transistors 540b, 540c and resistors 540d, 540e, 540f constitute the driving circuit 540 for driving the coils 527a and 527b.

Figure 18:
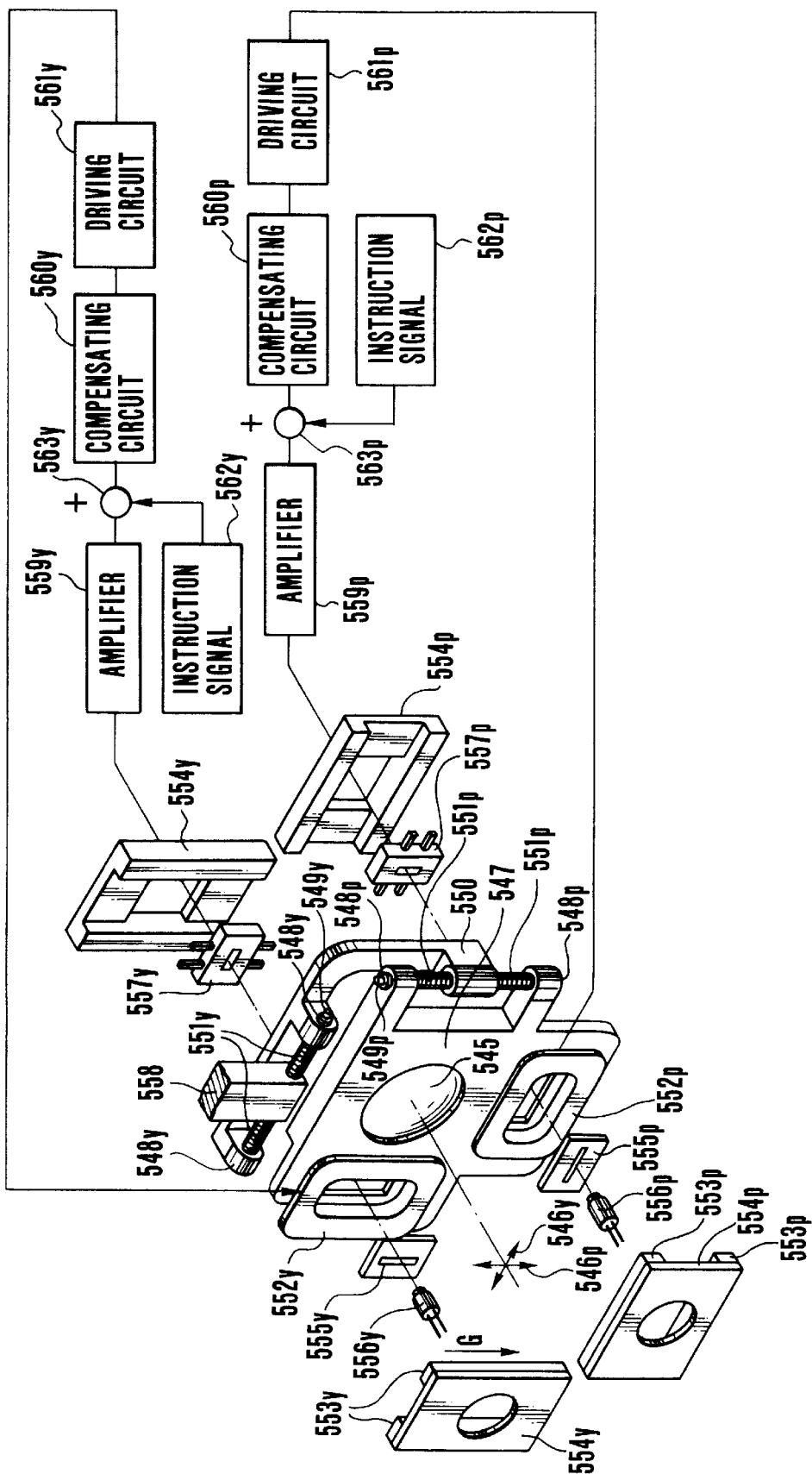
FIG. 18 is a diagrammatic view showing the mechanical and electrical arrangements of a correcting optical mechanism for executing image stabilizing control and flash-illumination-area control in the third embodiment of the present invention.

FIG. 18 is a schematic view showing the arrangement of a correcting optical mechanism suitable for use in the above-described system. A correcting lens 545 is drivable in two directions (a pitch direction 546p and a yaw direction 546y (i.e., the camera pitch 61p and the camera yaw 61y)) which are perpendicular to each other and intersect its optical axis at right angles. The arrangement of the correcting optical mechanism will be described below.

In the correcting optical mechanism shown in FIG. 18, a fixing frame 547 which holds the correcting lens 545 is slidable along a pitch slide shaft 549p by means of slide bearings 548p made of polyacetal resin (hereinafter referred to as "POM"). Pitch coil springs 551p coaxial to the pitch slide shaft 549p are held in compression between the slide bearings 548p of the fixing frame 547 in such a manner that the fixing frame 547 is held at or near its neutral position. The pitch slide shaft 549p is fitted through a first holding frame 550.

A pitch coil 552p is attached to the fixing frame 547. The pitch coil 552p is placed in a magnetic circuit formed by pitch magnets 553p and a pitch yoke 554p, and the fixing frame 547 is driven in the pitch direction 546p by causing an electric current to flow through the pitch coil 552p. The pitch coil 552p is provided with a pitch slit member 555p, and position detection of the fixing frame 547 with respect to the pitch direction 546p is performed in cooperation between a light emitter (infrared light emitting diode iRED) 556p and a light receiver (semiconductor position-sensitive detector PSD) 557p.

The arrangement of the above-described portions is similar to that of the corresponding portions shown in FIG. 1, and the following portions are added in the arrangement shown in FIG. 18.

Slide bearings 548y made of POX or the like are fitted in the first holding frame 550, whereby the first holding frame 550 is made slidable along a yaw slide shaft 549y fixed to the housing 558. Since the housing 558 is mounted to a lens barrel which is not shown, the first holding frame 550 is movable in the yaw direction 546y with respect to the lens barrel. Yaw coil springs 551y are provided coaxially to the yaw slide shaft 549y, so that the first holding frame 550 is held at or near its neutral position similarly to the fixing frame 547.

A yaw coil 552y is attached to the fixing frame 547. The fixing frame 547 is also drivable in the yaw direction 546y in cooperation between yaw magnets 553y and a yaw yoke 554y. The yaw coil 552y is provided with a yaw slit member 555y, and position detection of the fixing frame 547 with respect to the yaw direction 546y is performed similarly to the pitch direction 546p.

Then, driving in the yaw direction 546y is also performed similarly to that in the pitch direction 546p.

Figure 19:
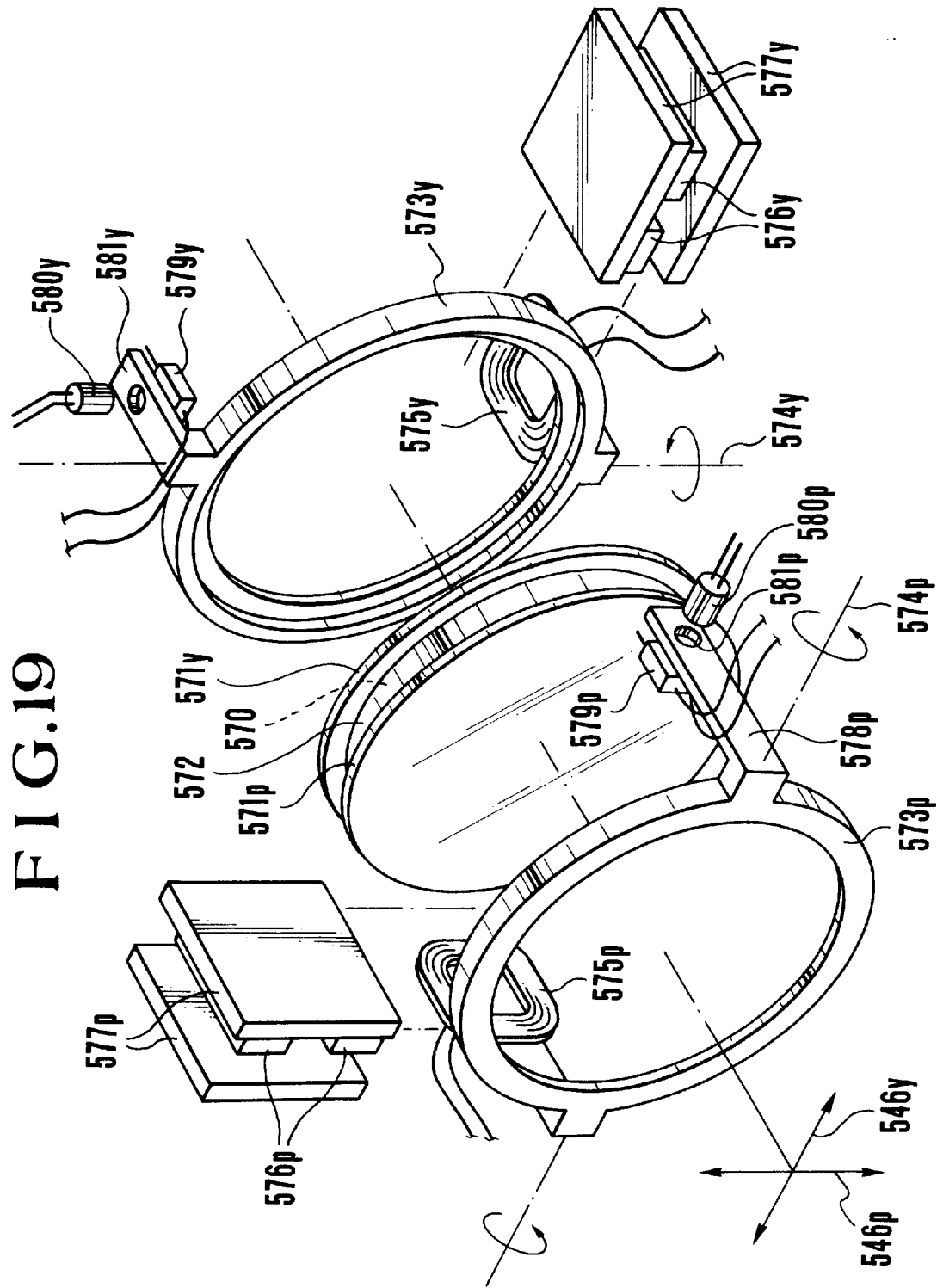
FIG. 19 is a schematic perspective view showing an arrangement in which the correcting optical mechanism shown in FIG. 18 is constructed by using a variable angle prism.

FIG. 19 is a schematic view showing the arrangement of the correcting optical mechanism using a variable angle prism.

In the arrangement shown in FIG. 19, a liquid 570 of high index of refraction, such as a silicone-based liquid, is enclosed without any bubble by two flat glasses 571p and 571y and a polyethylene film 572. The flat glass 571p is held by a pitch holding frame 573p which is supported rotatably about a pitch axis 574p. The flat glass 571y is held by a yaw holding frame 573y which is supported rotatably about a yaw axis 574y.

The pitch and yaw holding frames 573p and 573y are respectively provided with a pitch coil 575p and a yaw coil 575y. The pitch coil 575p is placed in a closed magnetic path formed by pitch magnets 576p and pitch yokes 577p, while the yaw coil 575y is placed in a closed magnetic path formed by pitch magnets 576y and pitch yokes 577y. The pitch and yaw holding frames 573p and 573y are respectively driven to rotate about the pitch axis 574p and the yaw axis 574y by causing electric currents to flow through the respective pitch and yaw coils 575p and 575y.

Displacement detecting light receivers 579p and 579y are respectively secured to an arm 578p of the pitch holding frame 573p and to an arm 578y of the yaw holding frame 573y. The respective displacement detecting light receivers 579p and 579y perform detection of the rotation of the pitch holding frame 573p about the pitch axis 574p and detection of the rotation of the yaw holding frame 573y about the yaw axis 574y by receiving reduced infrared light rays projected through holes 581p and 581y from corresponding infrared light emitters 580p and 580y, which are fixed in position. Although the displacement detecting light receivers 579p and 579y and the pitch and yaw coils 575p and 575y are placed under known position control, since the known position control has been described previously in connection with the slide type of correcting optical mechanism, description thereof is omitted.

In the above-described arrangement, when the pitch holding frame 573p rotates about the pitch axis 574p and the flat glass 571p inclines about the pitch axis 574p, light rays passing through the liquid 570 of high index of refraction are deflected in the direction of the arrow 546p. Also, when the yaw holding frame 573y rotates about the yaw axis 574y and the flat glass 571y inclines about the pitch axis 574y, light rays passing through the liquid 570 of high index of refraction are deflected in the direction of the arrow 546y.

In the camera provided with the above-described image stabilizing system, it is possible to easily add the flash-illumination-area controlling function described previously in connection with the first and second embodiments without a change of weight, size or cost.

In the image stabilizing system, if the correcting optical mechanism is to be driven to suppress an image shake due to a camera shake, the correcting optical mechanism is normally driven to operate about the optical axis. However, if a subject is located at the closest-distance position and if the flash-illumination-angle controlling function is operated to make the photographic optical axis eccentric, the correcting optical mechanism is driven on the basis of the output of the above-described vibration detecting means so as to operate about an optical axis (as an initial position) obtained by making the photographic optical axis eccentric, thereby effecting image-shake suppression.

More specifically, not only the output of the vibration detecting means but also the output of the AF information calculating circuit 21 or the computing circuit 26 shown in FIGS. 4 and 6 is inputted as the instruction signal 562p shown in FIG. 18, and the operation of making the optical axis eccentric is carried out on the basis of the instruction signal 562p (for example, the optical axis is made eccentric in an alternating manner at a low frequency corresponding to the frequency of a camera shake for the purpose of image-shake suppression, and the optical axis is further made eccentric for the purpose of correcting the flash illumination area).

With the above-described arrangement, it is possible to avoid occurrence of the portion insufficiently illuminated with flash light even during an image stabilizing operation.

It is to be noted that if a flash unit is used and exposure time is short, since the influence of a camera shake can be substantially ignored, the image stabilizing system is made inoperative and the optical axis is made eccentric for the purpose of controlling only the flash illumination area. (In many cases, exposure time is normally short during the use of a flash unit, and it is a rare case to perform "slow sync flash photography" (in which a flash unit is used together with a slow shutter speed and a long exposure time) which is utilized when it is necessary to photograph both a subject and a background at night as a visible image.)

It is also to be noted that during slow sync flash photography in which the image stabilizing system and a flash unit are used together, the time interval during which the flash unit emits flash light and the time interval during which the image stabilizing system operates are prevented from overlapping with each other, that is, during an exposure operation, exposure using only the image stabilizing system is first carried out, and then the image stabilizing system is stopped and after the flash unit is made to emit flash light, the exposure is brought to an end. This sequence is intended to eliminate the problem that since the image stabilizing system performs extremely precise control, a noise due to a large amount of current flowing during the emission of the flash unit may adversely affect the image stabilizing system to deteriorate the precision of image stabilization.

In the above-described arrangement, a so-called "second-curtain sync flash" is used in which exposure using no flash unit is first performed and then the flash unit is made to emit flash light immediately before the end of the exposure. During the use of the image stabilizing system, if the flash unit is made to emit flash light at the start of exposure (first-curtain sync flash), the flash unit starts a charging operation immediately after the end of the emission, with the result that when the Image stabilizing system is operated after the emission of the flash unit, since the flash unit is being charged, no sufficient power is supplied to the image stabilizing system. The second-curtain sync flash is used for preventing occurrence of the above-described problem. As a matter of course, if the image stabilizing system is to be operated during the first-curtain sync flash photography, an operational sequence of inhibiting charging of the flash unit until the end of exposure may be adopted to avoid the problem of no sufficient power being supplied.

If the image stabilizing system is not used, the first-curtain sync flash or the second-curtain sync flash can, of course, be freely selected according to a photographer's intention.

As is apparent from the foregoing description, according to each of the embodiments, during closest-distance photography or during wide-angle photography using a flash unit, the photographic optical axis is made eccentric so as to intersect the flash optical axis, that is, so that the flash illumination area covers the entire photographic area. Accordingly, since the problem of the insufficient illumination with flash light can be avoided even in the case of the closest-distance photography, effective utilization of the flash unit can be achieved.

In other words, in a case where a camera according to any of the embodiments adopts a TTL viewfinder, if the photographic optical axis is made eccentric, the photographer involuntarily inclines the camera obliquely to correctly aim at a subject within the viewfinder, so that the direction of illumination with flash light is shifted relatively downward with respect to the subject. In the case of an external-viewfinder camera, a frame displayed within the viewfinder is switched according to the amount of eccentricity of the photographic optical axis, so that a similar operation is performed by the photographer. Accordingly, even during the closest-distance photography or the wide-angle photography, the flash light can cover the whole subject (the entire area which can be photographed in a film plane).

It is to be noted that the present invention is applicable to either a flash unit of the type which is built in a camera or a flash unit of the type which is attachable to a camera.

Further, the present invention is applicable to a camera of the type to which an interchangeable lens having the aforesaid correcting optical means, i.e., optical-axis deflecting means, can be attached in use.

What is claimed is:

1. An apparatus adapted for use with a camera having a phototaking optical axis and that uses a signal outputting circuit that outputs a signal corresponding to a distance from the camera to an object, and with optical means having an optical axis different from the phototaking axis, and adapted for use in an image-shake correction device including optical axis deflection means for deflecting the phototaking optical axis of the camera to correct image-shake, said apparatus comprising:

parallax correction control means for causing the optical axis deflecting means to perform optical axis deflection to correct parallax between the phototaking optical axis of the camera and the optical axis of the optical means; and variation means for varying a maximum amount of optical axis deflection of the optical axis deflection means according to an output signal of the signal output circuit corresponding to the distance from the camera to the object.

2. An apparatus according to claim 1, wherein said parallax correction control means causes the image-shake preventing device to perform an operation so as to avoid a parallax between a first aiming area defined by an aiming portion for aiming the camera and a second aiming area defined by the optical system for forming the received image.

3. An apparatus according to claim 2, wherein said aiming portion includes an illumination portion for irradiating an object to be imaged with light.

4. An apparatus according to claim 2, wherein, when the output signal of said signal output circuit indicates that the distance from the camera to the object is less than a predetermined amount, said parallax correction control means causes the image-shake correction device to perform such that an intersection point at which an aiming direction axis of the aiming portion and an optical axis of the optical system substantially intersect each other is on the side of the apparatus nearest the object to be imaged.

5. An apparatus according to claim 1, further comprising means for causing said image-shake correction device to perform an image-shake correction operation when said parallax correction control means has performed a parallax control operation.

6. An apparatus according to claim 1, wherein said image-shake correction device comprises a luminous flux deflection portion for deflecting a luminous flux.

7. An apparatus according to claim 1, further comprising means for joining the apparatus with said image-shake correction device.

8. An apparatus adapted for use with a camera, a flash device for flash photography, an image-shake correction device selectively operable for correcting image-shake of the camera, and a power source for supplying power to the flash device and the image-shake correction device, the apparatus comprising:

flash photography control means for controlling the flash device so as to operate in one of a first flash mode, in which the flash device is controlled so as to flash in synchronism with an exposure finishing operation of the camera, and a second flash mode, in which the flash device is controlled so as to flash at a timing different than in the first flash mode; and selection means for selecting the first flash mode or the second flash mode of said flash photography control means, said selection means automatically selecting the first flash mode when the camera is performing a photography operation and the image-shake correction device is operable for correcting image-shake of the camera.

9. An apparatus according to claim 8, wherein the photography operation is an exposure operation.

10. An apparatus according to claim 8, wherein the image-shake correction device comprises means for deflecting a photographic luminous flux.

11. An apparatus according to claim 8, further comprising means for joining the apparatus with the camera.

12. An apparatus according to claim 8, wherein the flash device includes means for joining the flash device with the camera.

13. An apparatus according to claim 8, wherein the flash device includes means for detachably mounting the flash device on the camera.

14. An apparatus adapted for use with a camera, a flash device for flash photography, an image-shake correction device selectively operable for correcting image-shake of the camera, and a power source for supplying power to the flash device and the image-shake correction device, the apparatus comprising:

photography control means for controlling operation of the camera and the image-shake correction device so as to simultaneously perform a photography operation and an image shake correction operation; and flash control means for controlling operation of the flash device, wherein said flash control means controls operation of the flash device so as to flash in synchronism with a photography finishing operation of the camera when the camera is performing a photography operation and the image-shake correction device simultaneously is performing an image-shake correction operation.

15. An apparatus according to claim 14, wherein said photography control means controls the camera and the image-shake correction device so as to operate in one of a first photography mode, in which the camera performs a photography operation and the image-shake correction device simultaneously performs an image-shake correction operation, and a second photography mode, in which the camera performs the photography operation and the image-shake correction device does not perform the image-shake correction operation, and wherein said flash control means controls the flash device so as to flash in synchronism with the photography finishing operation at least when a photography operation is performed with a flash of the flash device in the first photography mode.

16. An apparatus according to claim 15, wherein, when photography is performed with a flash of the flash device, said selection means selects the first and second photography modes in accordance with a shutter speed.

17. An apparatus according to claim 16, wherein, when the camera performs a photography operation with a flash of the flash device, and the shutter speed is slower than a predetermined shutter speed, said selection means selects the first photography mode.

* * * * *

UNITED STATES PATENT AND TRADEMARK OFFICE
CERTIFICATE OF CORRECTION

PATENT NO. : 6,035,132
DATED : March 7, 2000
INVENTOR(S): KOICHI WASHISU, ET AL.

Page 1 of 2

It is certified that error appears in the above-identified patent and that said Letters Patent is hereby corrected as shown below:

Column 1

Line 36, "side). of" should read --side).  Of--.

Column 6

Line 38, "closet-distance" should read
--closest-distance--.
    Line 46, "closet-distance" should read
--closest-distance--.

Column 8

Line 4, "According," should read --Accordingly,--.

UNITED STATES PATENT AND TRADEMARK OFFICE
CERTIFICATE OF CORRECTION

PATENT NO. : 6,035,132
DATED      : March 7, 2000
INVENTOR(S): KOICHI WASHISU, ET AL.

It is certified that error appears in the above-identified patent and that said Letters Patent is hereby corrected as shown below:

<u>Column 10</u>

Line 27, "same" should read --same time--.
    Line 35, "an south" should read --a south--.

<u>Column 12</u>

Line 21, "flow" should read --flow through--.

<u>Column 16</u>

Line 8, "Image" should read --image--.

Signed and Sealed this

Thirteenth Day of March, 2001

*Attest:*

NICHOLAS P. GODICI

*Attesting Officer*      *Acting Director of the United States Patent and Trademark Office*